(12) United States Patent
Kim et al.

(10) Patent No.: US 10,439,838 B2
(45) Date of Patent: Oct. 8, 2019

(54) CONTROL DEVICE, METHOD OF CONTROLLING THE SAME, AND INTEGRATED CONTROL SYSTEM

(71) Applicant: Samsung Electronics Co., Ltd., Suwon-si, Gyeonggi-do (KR)

(72) Inventors: Hark-joon Kim, Ansan-si (KR); Sung-bin Kuk, Suwon-si (KR); Mi-ra Park, Seoul (KR); Sang-il Lee, Seongnam-si (KR); Min-kyu Jung, Seoul (KR); Seong-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 14/881,813

(22) Filed: Oct. 13, 2015

(65) Prior Publication Data
US 2016/0119160 A1    Apr. 28, 2016

(30) Foreign Application Priority Data

Oct. 24, 2014  (KR) .................. 10-2014-0145140

(51) Int. Cl.
*H04L 12/28*     (2006.01)
*G08C 19/00*     (2006.01)
(Continued)

(52) U.S. Cl.
CPC ........ *H04L 12/2803* (2013.01); *G06F 3/0481* (2013.01); *G08C 19/00* (2013.01);
(Continued)

(58) Field of Classification Search
CPC . H04L 12/2803; H04L 12/281; H04L 67/025; G06F 3/0481; G08C 19/00;
(Continued)

(56) References Cited

U.S. PATENT DOCUMENTS 7,567,305 B2 *  7/2009  Joo ..................... H04N 5/44543
                                                           348/731
9,124,917 B2    9/2015  Ahn
(Continued)

FOREIGN PATENT DOCUMENTS

| CN | 103000021 A | 3/2013 |
| CN | 103634460 A | 3/2014 |
| WO | 00-39964 A1 | 7/2000 |

OTHER PUBLICATIONS

Summons to attend oral proceedings dated Jan. 15, 2019, issued in the European Patent Application No. 15853315.8.
(Continued)

*Primary Examiner* — Thomas D Alunkal
(74) *Attorney, Agent, or Firm* — Jefferson IP Law, LLP

(57) ABSTRACT

A control device, a method of controlling the same, and an integrated control system are provided. The method includes in response to a setting command being input, registering a setting state of at least one device connected to the control device at a time point when the setting command is input as a preferred setting state of the at least one device, and, in response to an execution command being input, transmitting a control command to the at least one device based on the registered preferred setting state.

19 Claims, 31 Drawing Sheets

(51) Int. Cl.
    *H04L 29/08* (2006.01)
    *G06F 3/0481* (2013.01)
    *H04N 21/41* (2011.01)
    *H04N 21/422* (2011.01)
(52) U.S. Cl.
    CPC .......... *H04L 12/281* (2013.01); *H04L 67/025* (2013.01); *H04N 21/4131* (2013.01); *H04N 21/42207* (2013.01); *H04N 21/42225* (2013.01); *H04N 21/42226* (2013.01); *G08C 2201/20* (2013.01); *G08C 2201/92* (2013.01)
(58) Field of Classification Search
    CPC ............ G08C 2201/20; G08C 2201/92; H04N 21/4131; H04N 21/42207; H04N 21/42226
    See application file for complete search history.

(56) References Cited

U.S. PATENT DOCUMENTS

| | | | |
|---|---|---|---|
| 9,844,096 B2 | 12/2017 | Son et al. | |
| 2003/0140107 A1* | 7/2003 | Rezvani | H04L 41/0233 709/208 |
| 2005/0097618 A1* | 5/2005 | Arling | H04L 12/2805 725/114 |
| 2011/0277001 A1* | 11/2011 | Kaluskar | H04L 12/2818 725/80 |
| 2012/0007763 A1 | 1/2012 | Hale et al. | |
| 2012/0062796 A1* | 3/2012 | Roberts | H04N 5/4403 348/569 |
| 2013/0070154 A1 | 3/2013 | Ahn | |
| 2014/0055251 A1 | 2/2014 | Son et al. | |
| 2014/0064738 A1* | 3/2014 | Chen | G08C 23/04 398/112 |
| 2014/0142726 A1* | 5/2014 | Bennett | G05B 19/042 700/47 |
| 2016/0183326 A1 | 6/2016 | Son et al. | |

OTHER PUBLICATIONS

Result of consultation dated Jun. 17, 2019, issued in the European Patent Application No. 15853315.8.
Chinese Office Action dated Aug. 13, 2019, issued in Chinese Application No. 201580057816.0.

* cited by examiner

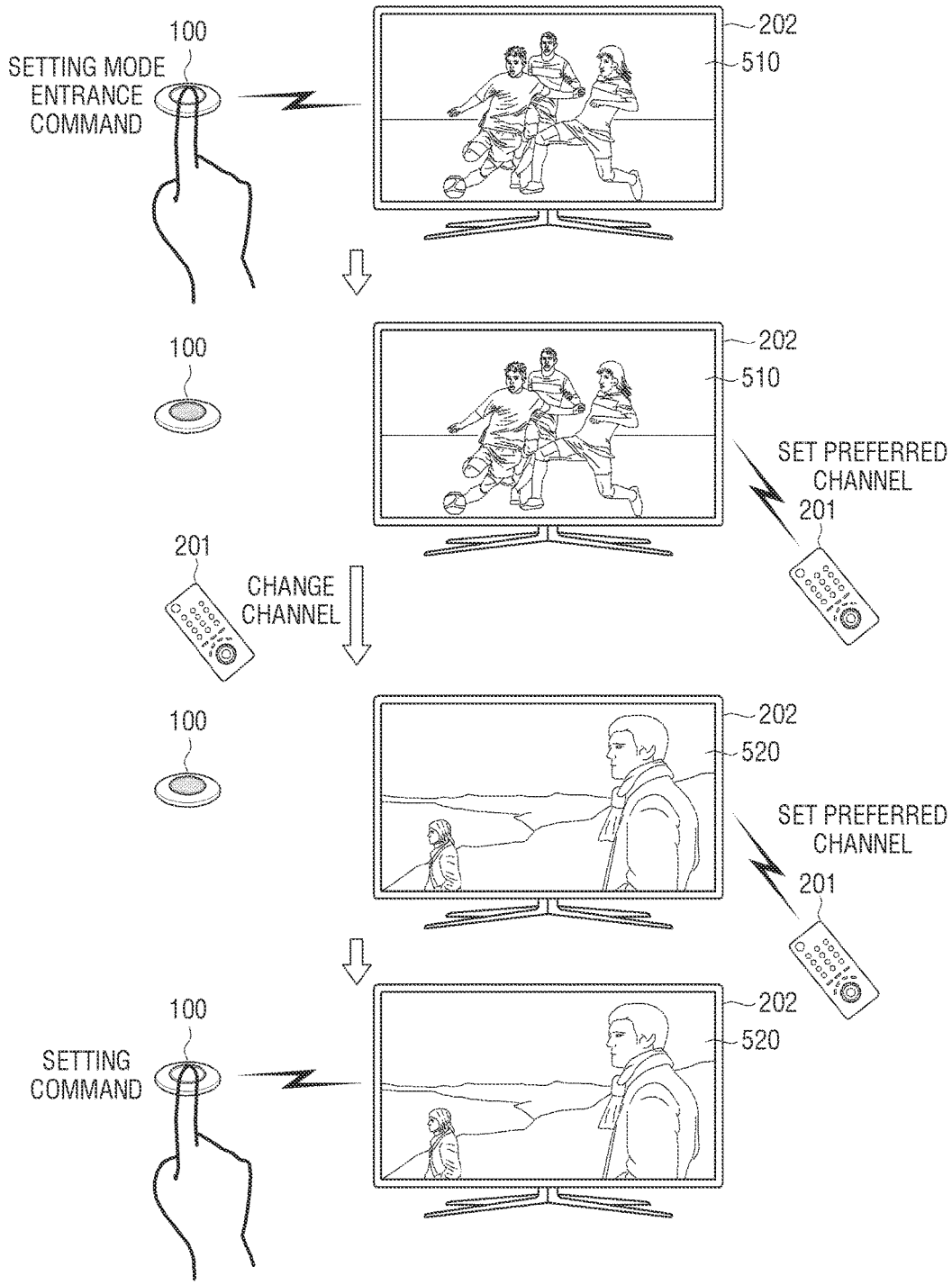

FIG. 12
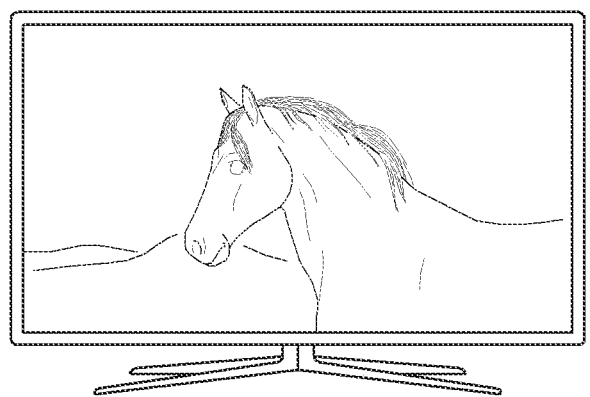
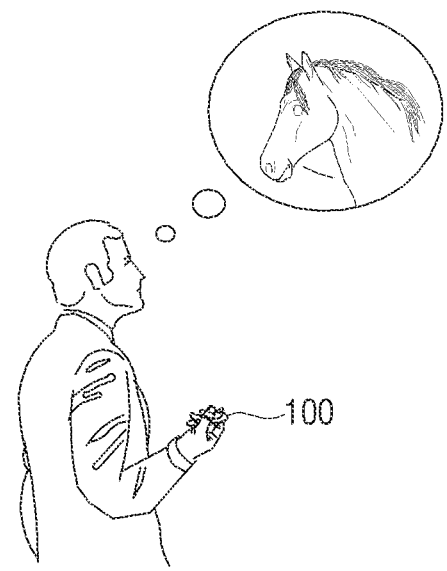

ions of the present disclosure will be more apparent from the following description taken in conjunction with the accompanying drawings, in which:

CONTROL DEVICE, METHOD OF CONTROLLING THE SAME, AND INTEGRATED CONTROL SYSTEM

CROSS-REFERENCE TO RELATED APPLICATION(S)

This application claims the benefit under 35 U.S.C. § 119(a) of a Korean patent application filed on Oct. 24, 2014 in the Korean Intellectual Property Office and assigned Serial number 10-2014-0145140, the entire disclosure of which is hereby incorporated by reference.

TECHNICAL FIELD

The present disclosure relates to a control device, a method of controlling the same, and an integrated control system. More particularly, the present disclosure relates to a control device, a method of controlling the same, and an integrated control system, for setting an arbitrary function desired by a user by at least one device.

BACKGROUND

Recently, various devices have become widely popular to users and one device also provides various functions. Along with diversified functions, there is a problem in that various manipulations are required to use an arbitrary function desired by a user. For example, when a specific function is performed using a button of a remote controller, a number of button manipulations for performing functions has been gradually increased. In addition, as remote controllers are provided to respective devices, the number of remote controllers increases by as much as the number of devices in general home.

In order to address this problem, an integrated controller method of the related art is proposed. This method integrates all functions or materials of a device as a classification target into one device. The integrated controller method of the related art is configured in such a way that various functions containing various functions as well as power of each device are mapped to respective buttons. However, the integrated controller has a problem in that the number of buttons increases to correspond to the number of devices and a plurality of operations are not capable of being simultaneously performed.

According to the related art, a user defined remote controller is also proposed. However, the user defined remote controller of the related art has a problem in that a specific program needs to be installed for function setting or specific hardware is further required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described above. Accordingly, an aspect of the present disclosure is to provide a control device, a method of controlling the same, and an integrated control system, for registering settings of at least one device via simple manipulation and for allowing user definition to control at least one device according to the registered setting.

In accordance with an aspect of the present disclosure, a method of controlling a control device is provided. The method includes in response to a setting command being input, registering a setting state of at least one device connected to the control device at a time point when the setting command is input as a preferred setting state of the at least one device, and, in response to an execution command being input, transmitting a control command to the at least one device based on the registered preferred setting state.

The registering may include, in response to a setting mode entrance command for registering a preferred setting state being input, transmitting a setting start signal for allowing the at least one device to enter a setting mode for registering the preferred setting state, and in response to the setting command being input after a setting state of the at least one device is changed while the setting mode is maintained, registering a finally changed setting state of the at least device as the preferred setting state of the at least one device.

The registering may include, in response to the setting command being input, transmitting a setting end signal to the at least one device, and the setting end signal may be a signal for storing a setting state at a time point when the at least one device receives the setting end signal.

The registering may include, in response to a setting mode entrance command for registering a preferred setting state being input, transmitting a setting start signal for allowing the at least one device to enter a setting mode for registering the preferred setting state, in response to a preferred setting state additional command while the setting mode is maintained, registering a first setting state of the at least one device as a first preferred setting state, and in response to the preferred setting state additional command being re-input after a setting state of the at least one device is changed to a second setting state from the first setting state, registering the second setting state of the at least one device as a second preferred setting state.

The transmitting may include, in response to the execution command being input, transmitting a control command for changing a setting state of the at least one device to the registered first preferred setting state, and in response to the execution command being re-input, transmitting a control command for changing a setting state of the at least one device to the registered second preferred setting state.

The registering may include registering a setting state changing order of the at least one device together, and the transmitting may include sequentially transmitting the control command to the at least one device based on the registered setting state changing order.

The registering may include, in response to the setting command being input, transmitting a setting end signal and a setting state request signal to the at least one device, and in response to a device identifier (ID) and setting state information being received from the at least one device in response to the signal, matching and storing the device ID, the received setting state information, and a control code for changing a setting state.

The registering may include, in response to an operation of generating a widget icon being input, transmitting a setting start signal for allowing the at least one device to enter a setting mode, to the at least one device, displaying a user interface (UI) including a guidance message and a setting command input button, and in response to the setting command being input through a setting command input button included in the user equipment (UE) after a setting state of the at least one device is changed, transmitting a setting end signal to the at least one device and displaying the generated widget icon, and the transmitting may include transmitting a control command to the at least one device in response to the widget icon being selected.

The setting command may be input in response to a button being pushed for a preset time period or more, and the execution command may be input when the button is pushed for a period time less than the preset time period.

In accordance with another aspect of the present disclosure, a control device is provided. The control device includes an input unit configured to receive a user command, a communication unit configured to perform transmission and reception with at least one device, and a controller configured, in response to a setting command being input through the input unit, to register a setting state of at least one device connected to the control device at a time point when the setting command is input as a preferred setting state of the at least one device, and, in response to an execution command being input through the input unit, to control the communication unit to transmit a control command to the at least one device based on the registered preferred setting state.

The controller, in response to a setting mode entrance command for registering a preferred setting state being input through the input unit, may transmit a setting start signal for allowing the at least one device to enter a setting mode for registering the preferred setting state, and in response to the setting command being input through the input unit after a setting state of the at least one device is changed while the setting mode is maintained, may register a finally changed setting state of the at least device as the preferred setting state of the at least one device.

The controller, in response to the setting command being input through the input unit, may control the communication unit to transmit a setting end signal to the at least one device, and the setting end signal may be a signal for storing a setting state at a time point when the at least one device receives the setting end signal.

The controller, in response to a setting mode entrance command for registering a preferred setting state being input through the input unit, may transmit a setting start signal for allowing the at least one device to enter a setting mode for registering the preferred setting state, in response to a preferred setting state additional command while the setting mode is maintained, may register a first setting state of the at least one device as a first preferred setting state, and in response to the preferred setting state additional command being re-input through the input unit after a setting state of the at least one device is changed to a second setting state from the first setting state, may register the second setting state of the at least one device as a second preferred setting state.

The controller, in response to the execution command being input through the input, may transmit a control command for changing a setting state of the at least one device to the registered first preferred setting state, and in response to the execution command being re-input through the input unit, may transmit a control command for changing a setting state of the at least one device to the registered second preferred setting state.

The controller may register a setting state changing order of the at least one device together and control the communication unit to sequentially transmit the control command to the at least one device based on the registered setting state changing order.

The control device may further include a storage, wherein the controller, in response to the setting command being input through the input unit, may control the communication unit to transmit a setting end signal and a setting state request signal to the at least one device, and, in response to a device ID and setting state information being received from the at least one device in response to the signal, may match and store the device ID, the received setting state information, and a control code for changing a setting state.

The control device may further include a display, wherein the controller, in response to an operation of generating a widget icon being input, may control the communication unit to transmit a setting start signal for allowing the at least one device to enter a setting mode, to the at least one device, may control the display to display a UI including a guidance message and a setting command input button, in response to the setting command being input through a setting command input button included in the UE after a setting state of the at least one device is changed, may control the communication unit to transmit a setting end signal to the at least one device and controls the display to display the generated widget icon, in response to the widget icon being selected, may control the display to display the generated widget icon, and in response to the widget icon being selected, may control the communication unit to transmit a control command to the at least one device.

The setting command may be input in response to a button being pushed for a preset time period or more, and the execution command may be input when the button is pushed for a period time less than a preset time period.

In accordance with another aspect of the present disclosure, an integrated control system is provided. The integrated control system includes a control device configured, in response to a setting mode entrance command being input, to transmit a setting start signal for allowing at least one connected device to enter a setting mode, to the at least one connected device, in response to a setting command being input, to transmit a setting end signal to the at least one device, and in response to an execution command being input, to transmit a control command to the at least one device, and at least one device configured, in response to the setting start signal being received from the control device, to enter a setting mode, to change a setting state after entering the setting mode, in response to the setting end signal being received from the control device, to register a setting state at a time point when a setting end signal is received as a preferred setting state, and in response to the control command being received from the control device, to change a setting state to the registered preferred setting state.

According to the aforementioned various embodiments of the present disclosure, a user may easily enter a specific preferred setting state and may use the registered preferred setting state to easily reproduce a desired device environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B are diagrams for explanation of a case in which a plurality of preferred setting states are registered and a state is sequentially changed to the plurality of registered preferred setting states, according to various embodiments of the present disclosure;

FIGS. 11, 12, 13, and 14 are diagrams illustrating various scenarios in which a control device controls at least one device to perform a function corresponding to a setting state defined by a user using the control device according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

According to an embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

The present disclosure will now be described more fully with reference to the accompanying drawings, in which various embodiments of the present disclosure are shown.

Figure 1:
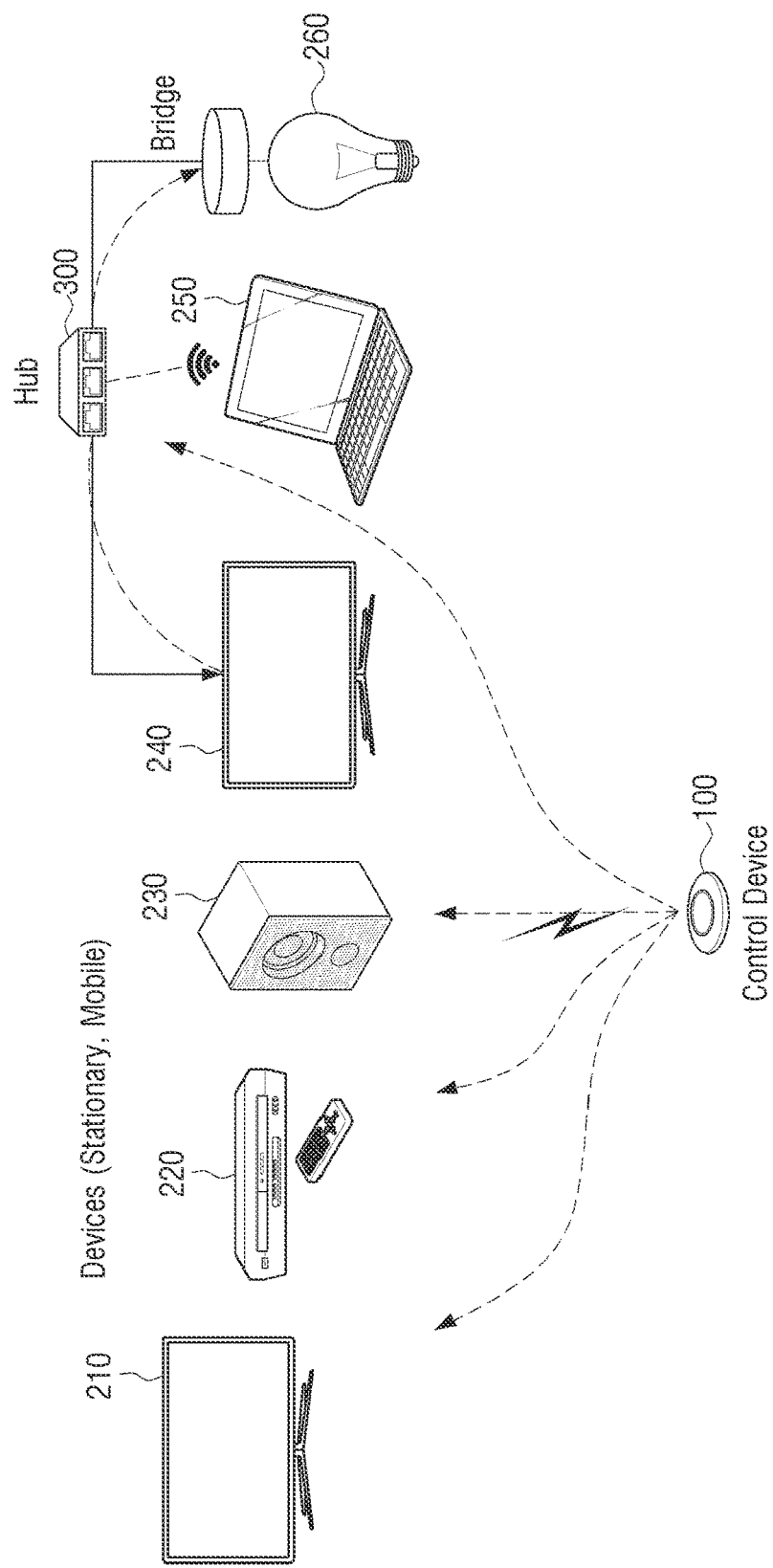
FIG. 1 is a diagram illustrating an integrated control system according to an embodiment of the present disclosure.

FIG. 1 is a diagram illustrating an integrated control system according to an embodiment of the present disclosure.

Referring to FIG. 1, the integrated control system includes a control device 100 and at least one device 210, 220, 230, 240, 250, and 260. The integrated control system may further include a hub 300 and may communicate with at least one 240, 250, and 260 through the hub 300. In addition, the hub 300 may replace functions of at least one device 240, 250, and 260 connected to the hub 300.

The at least one device 210, 220, 230, 240, 250, and 260 is connected to the control device 100 and transmits a setting state to the control device 100. In addition, the at least one device 210, 220, 230, 240, 250, and 260 may receive a control command received from the control device 100 and change a setting state. As illustrated in FIG. 1, the at least one device 210, 220, 230, 240, 250, and 260 may be a display device, an audio device, a computer, or the like.

The at least one device 210, 220, 230, 240, 250, and 260 may not be connected directly to the control device 100 and may be connected to the control device 100 through the hub 300. For example, it may be considered that various electronic devices are connected to a network at home containing a home network established therein. The control device 100 may control an electronic device by simply communicating with the hub 300 of a home network. In particular, when communication between the control device 100 and an electronic device does not have compatibility in a communication method or the like, an embodiment in which the control device 100 and the electronic device are directly and indirectly connected through the hub 300.

In addition, the hub 300 may replace functions of the at least one connected device 240, 250, and 260. The hub 300 may replace a device 200 to store a setting state of each device 200 connected to the hub 300 or to transmit the setting state to the control device 100. For example, a smart hub such as a television (TV) and a lamp may store setting state information of a plurality of devices connected to the smart hub as well as a function for simple communication compatibility. In response to a setting command being input, the control device 100 may receive the setting state of the at least one device 210, 220, 230, 240, 250, and 260 that are connected at a time point in which the setting command is input and may register the received setting state as a preferred setting state of the at least one device 210, 220, 230, 240, 250, and 260. In response to an execution command being input, the control device 100 may transmit a control command to the at least one device 210, 220, 230, 240, 250, and 260 based on the registered preference setting state.

By virtue of the aforementioned integrated control system, a user may control various devices to register an arbitrary setting environment at various devices desired by the user and to change a setting state of a device in the registered setting environment via simple integrated manipulation.

Figure 2A:
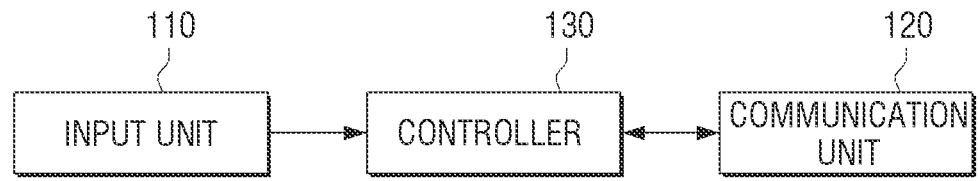
FIGS. 2A and 2B are schematic block diagrams of a control device according to various embodiments of the present disclosure.
Figure 2B:
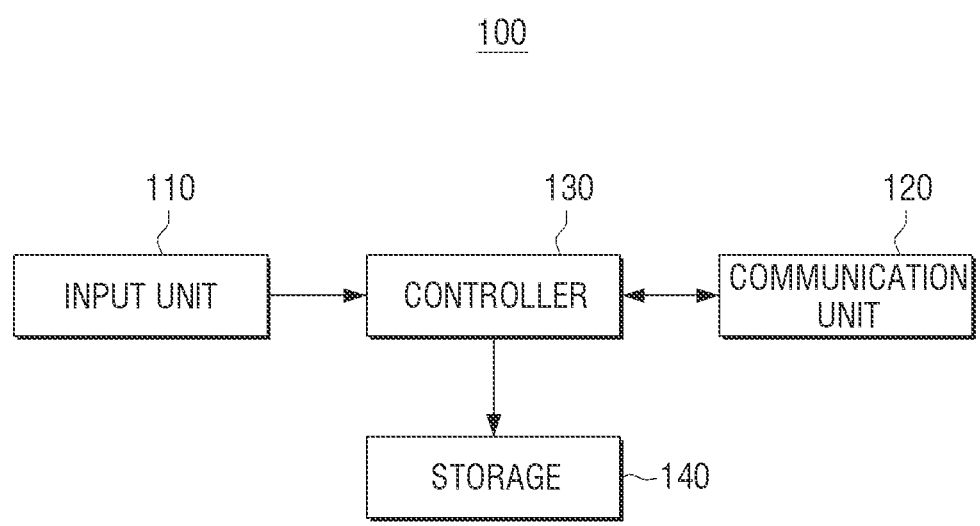

FIGS. 2A and 2B are schematic block diagrams of the control device 100 according to various embodiments of the present disclosure.

Referring to FIG. 2A, the control device 100 includes an input unit 110, a communication unit 120, and a controller 130. Hereinafter, although the case in which the control device 100 is embodied as a button-type small control device will be mainly described, the control device 100 may be embodied in various forms such as a smart phone and a remote controller, but is not limited thereto. According to an embodiment of the present disclosure, as illustrated in FIG. 2B, the control device 100 may further include a storage 140. In addition, a button type control device 100 may further include a power supply (not shown), an adhesion portion (not shown), a light emitting diode (LED) portion (not shown), and so on.

The input unit 110 performs a function of receiving a user command. The input unit 110 may be embodied as a button, a touchscreen, a widget, an application, a keypad, or the like. In addition, the input unit 110 may use various methods of pushing the same button so as to receive different user commands.

According to an embodiment of the present disclosure, the input unit 110 may be embodied using a physical switch such as a tact switch. The tact switch is advantageous due to its small size and low cost. In addition, the input unit 110 may be embodied in the form of a single button, but is not limited thereto, and for example, the input unit 110 may be embodied in a manner such as 2-way and 4-way button so as to map different functions to respective directions. When the input unit 110 is embodied in the form of a single button, the input unit 110 may receive various types of commands using different input methods. For example, when an operation of pushing the input unit 110 is maintained for a preset time period or more, the controller 130 may determine that a setting command is input, and when the operation of pushing the input unit 110 is maintained for a time period smaller than a preset time period, the controller 130 may determine that an execution command is input.

The communication unit 120 may communicate with at least one device 200. The communication unit 120 includes a wireless communication module and performs a wireless communication function with at least one device 200. For example, the communication unit 120 may transmit a control device identifier (ID) to at least one device 200. As another example, the communication unit 120 transmits a signal for requesting a setting state of at least one device 200 and receives setting information from the at least one device 200. In addition, the communication unit 120 transmits a control command to the at least one device 200.

For example, assuming only local area communication, near field communication (NFC) may be used. NFC is technology for wireless communication at a very short distance and is being used in various services such as traffic, tickets, and payment. Data communication speed that has been currently supported is 424 kbits per second. For connection and attribute information interchange between the button-type control device 100 and the at least one device 200, an NFC reader and an NFC tag may be installed in each of the button-type control device 100 and the at least one device 200. Whether communication is connected may be checked via a smooth operation in which the button-type control device 100 and the at least one device 200 contact each other using the installed NFC reader and the NFC tag, and information recorded in the NFC tag installed in the at least one device 200 may be read by the NFC reader installed in the button-type control device 100 so as to receive setting information and so on of the at least one device 200 by the communication unit 120. However, in an embodiment of the present disclosure, the button-type control device 100 may also smoothly control the at least one device 200 at a long range, and thus a method such as wireless local area network (LAN), infrared (IR) communication, ZigBee communication, Wi-Fi, and Bluetooth may be used. In addition, the communication unit 120 may include an antenna.

The control device 100 according to an embodiment of the present disclosure does not necessarily include the storage 140. For example, the control device 100 may receive only a setting mode entrance command, a setting command, and an execution command and transmit the commands to the at least one device 200. In this case, the at least one device 200 changes a setting state and stores a preferred setting state.

The control device 100 according to an embodiment of the present disclosure may include the storage 140. In this case, the control device 100 may receive a device ID and setting state information of the at least one device 200, match the device ID and the setting state information with a control code, and then store the result information.

The storage 140 stores various programs, modules, and data required for an operation of the control device 100. In addition, the storage 140 may match the device ID and the setting state information from the at least one device 200 with the control code and store the result information. For miniaturization, the storage 140 may be embodied in the form of a cache memory inside a central processing unit (CPU).

An adhesion portion (not shown) may allow the button-type control device 100 to be adhered to a specific location of home or offices. The button-type control device 100 may be miniaturized at low costs, and thus only a specific preferred setting state may be mapped and used. In this case, the button-type control device 100 may be adhered to a location where a specific preferred setting state is frequently used such that a user may transmit a specific control command to the at least one device 200 without carrying the control device 100.

A power supply (not shown) supplies power to the button-type control device 100. For miniaturization, the power supply may be embodied in a form such as a button-type mercury battery.

A light emitting diode (LED) portion (not shown) performs a function of indicating a state of the button-type control device 100. For example, after the button-type control device 100 transmits a setting mode entrance command to the at least one device 200, the controller 130 may control the LED portion to emits a blinking signal by an LED included in the LED portion in order to indicate a state in which at least one device enters a setting mode.

The controller 130 controls an overall operation of the control device 100. The controller 130 may include a read only memory (ROM) and a random access memory (RAM), for storing data and a module for controlling a CPU and the control device 100. As another example, for miniaturization, the controller 130 may be embodied using a micro controller unit (MCU).

In response to a setting command being input through the input unit 110, the controller 130 controls the communication unit 120 to receive a setting state of the at least one device 200 connected to the control device 100 at a time point when a setting command is input and registers the received setting state as a preferred setting state of the as least one device 200. In addition, in response to an execution command being input through the input unit 110, the controller 130 may control the communication unit 120 to transmit a control command to the at least one device 200 based on the registered preferred setting state.

According to an embodiment of the present disclosure, in response to a setting mode entrance command for registering the preferred setting state being input through the input unit 110, the controller 130 may control the communication unit 120 to transmit a setting start signal that allows the at least one device 200 to enter the setting mode for registering the preferred setting state. After a setting state of the at least one device 200 is changed while a setting mode is maintained, when a setting command is input through the input unit 110, the controller 130 may control the communication unit 120 to transmit a setting end signal to the at least one device 200. In response to the setting end signal, the at least one device 200 registers a lastly changed setting state as a preferred setting state. For example, the setting end signal may be a signal for storing a setting state at a time point when the at least one device 200 receives the setting end signal.

In response to an execution command being input through the input unit 110, the controller 130 may transmit a control command to the at least one device 200. For example, a control command signal may include control device ID information. The at least one device 200 changes a setting state to a preferred setting state according to the received control command.

According to an embodiment of the present disclosure, after the setting state of the at least one device 200 is changed while the at least one device 200 maintains a setting mode, in response to a setting command being input through the input unit 110, the controller 130 controls the communication unit 120 to receive a lastly changed setting state of the at least one device 200 and registers the received setting state as a preferred setting state of the at least one device 200.

In response to a setting mode entrance command being input through the input unit 110, the controller 130 may allow the at least one device 200 to enter a setting mode in order to register a preferred setting state and may simultaneously receive an initial setting state at a time point when a setting mode entrance command is input, from the at least one device 200. The controller 130 may compare the setting state of the at least one device 200, received in response to a setting command to be input later, with an initial setting state. The controller 130 may determine only a changed portion of the setting state via the setting state comparison to generate only a control command for the changed portion.

In response to a setting command being input through the input unit 110, the controller 130 may control the communication unit 120 to transmit a setting end signal to the at least one device 200. Simultaneously, the controller 130 may control the communication unit 120 to transmit a signal for requesting a setting state and receive a device ID and setting state information from the at least one device 200 in response to the request signal. The controller 130 matches the received device ID and setting state with a control code for changing the received device ID and stores the result information in the storage 140.

By virtue of the aforementioned control device 100, a plurality of setting states of the at least one device 200 may be executed according to a single control command. In addition, when a user wants to store a current setting state of the at least one device 200, a preferred setting state information including a control code for changing to a current setting state may be stored through a simple operation.

Hereinafter, a detailed operation of the controller 130 will be described with reference to FIGS. 3 to 7C.

Figure 3:
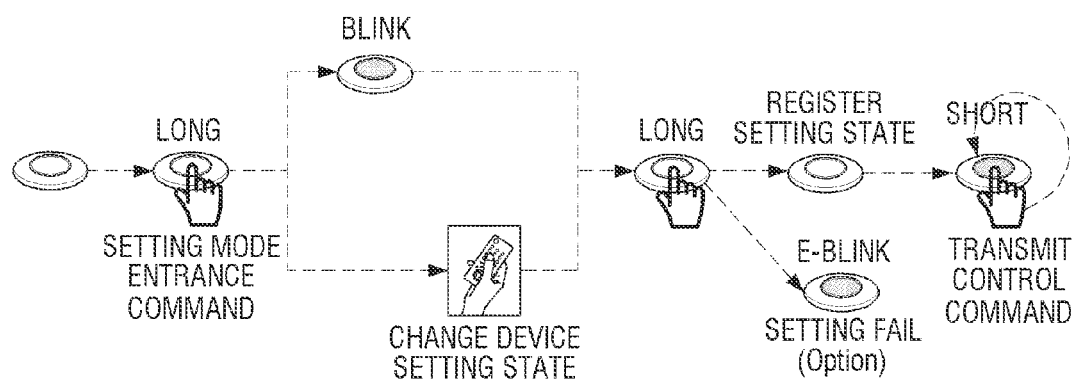
FIG. 3 is a schematic diagram illustrating an operation of a button type control device according to an embodiment of the present disclosure.

FIG. 3 is a diagram illustrating basic flow for registering a preferred setting state using the control device 100 embodied as a button-type control device according to an embodiment of the present disclosure.

Referring to FIG. 3, according to an embodiment of the present disclosure, when a button of the input unit 110 is clicked a long way, the controller 130 determines the click as a setting mode entrance command and controls the communication unit 120 to transmit a setting start signal to the at least one device 200. In order to indicate that a setting mode is maintained, the controller 130 may control an LED portion to blink an LED installed therein. While the at least one device 200 enters a setting mode and the setting mode is maintained, a setting state of the at least one device 200 may be changed. For example, the setting state may be changed through a setting button, a remote controller, or the like of the at least one device 200.

When a setting state is changed to a desired arbitrary state, and then the button of the input unit 110 is re-clicked a long way, the controller 130 determines that a setting command is input. In response to the setting command being input, the controller 130 may control the communication unit 120 to transmit a setting end signal to the at least one device 200. In response to the setting end signal being transmitted, the at least one device 200 registers a setting state changed while a setting mode is maintained as a preferred setting state. When errors occur, the controller 130 may control the LED portion to blink an LED installed therein in order to indicate that registration of the setting state fails to a user. As another example, the controller 130 may control the communication unit 120 to transmit a signal for requesting the device ID and setting state information of the at least one device 200 together with a setting end signal.

After the setting state is registered, in response to the button of the input unit 110 being clicked a short way, the controller 130 may control the communication unit 120 to transmit a control command for changing to the preferred setting state registered for the at least one device 200.

Figure 4A:
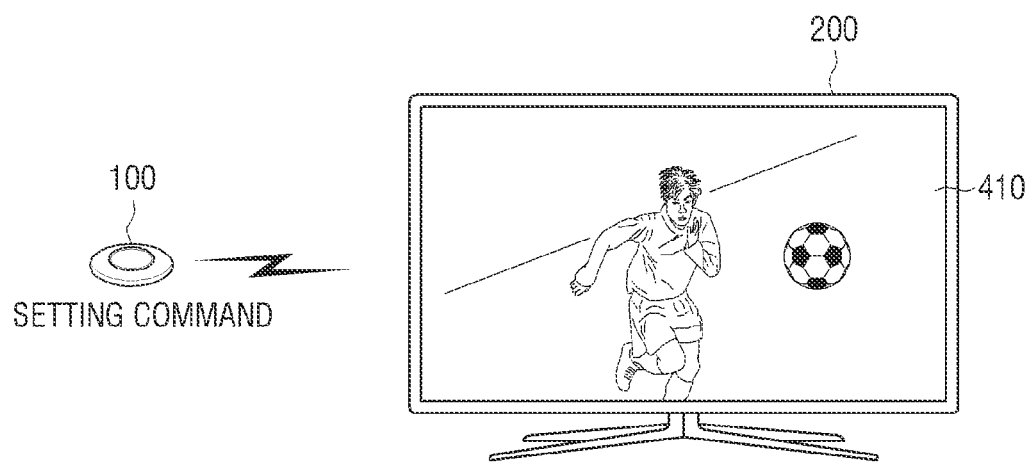
FIGS. 4A and 4B are diagrams illustrating a case in which a setting state is registered and executed in a television (TV) according to various embodiments of the present disclosure.
Figure 4B:
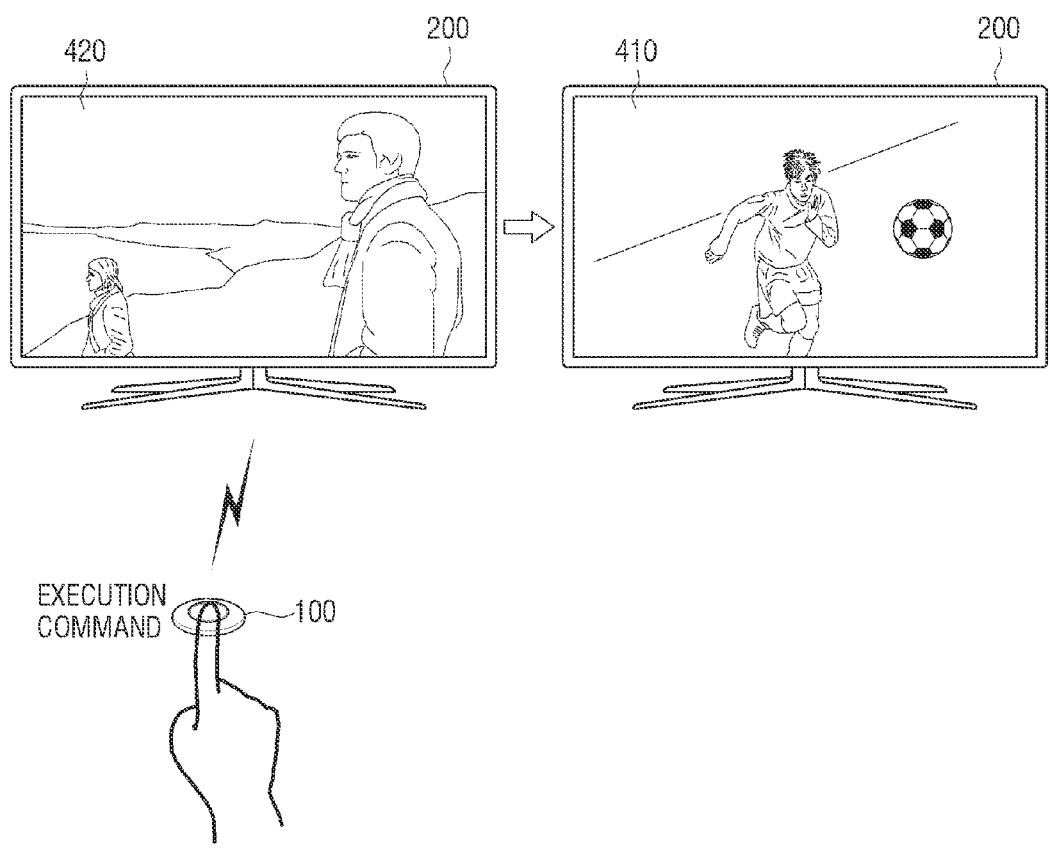

FIGS. 4A and 4B are diagrams illustrating the case in which a setting state is registered and executed in a TV according to various embodiments of the present disclosure.

Referring to FIG. 4A, a TV currently broadcasts a sports specialized channel 410 for which a user wants to set shortcut. In response to a setting command being input through the input unit 110 of the control device 100, the controller 130 transmits a setting end signal to a TV as the at least one device 200. In this case, the controller 130 may control the communication unit 120 to also transmit a control device ID. In response to a setting end signal being received, the at least one device 200 registers a state in which a channel in a setting state of the TV at a current time point is set to a preferred setting state. In addition, volume, an aspect ratio, or the like at a time point when a setting command is input may be registered together with a TV channel as a preferred setting state. In addition, setting about whether a specific function such as a soccer mode provided by a smart TV is executed may be registered together.

Referring to FIG. 4B, in response to an execution command being input through the input unit 110, the controller 130 may control the communication unit 120 to transmit a control command to the TV. In this case, the control command may include a control device ID of the control device 100. In response to this, the TV is mapped to the received control device ID and is changed to a stored preferred setting state. In response to an execution command being input through the input unit 110 while another channel 420 is displayed on a TV, the controller 130 may transmit a control command to change a TV channel to the sports specialized channel 410 as the stored preferred setting state.

Figure 5B:
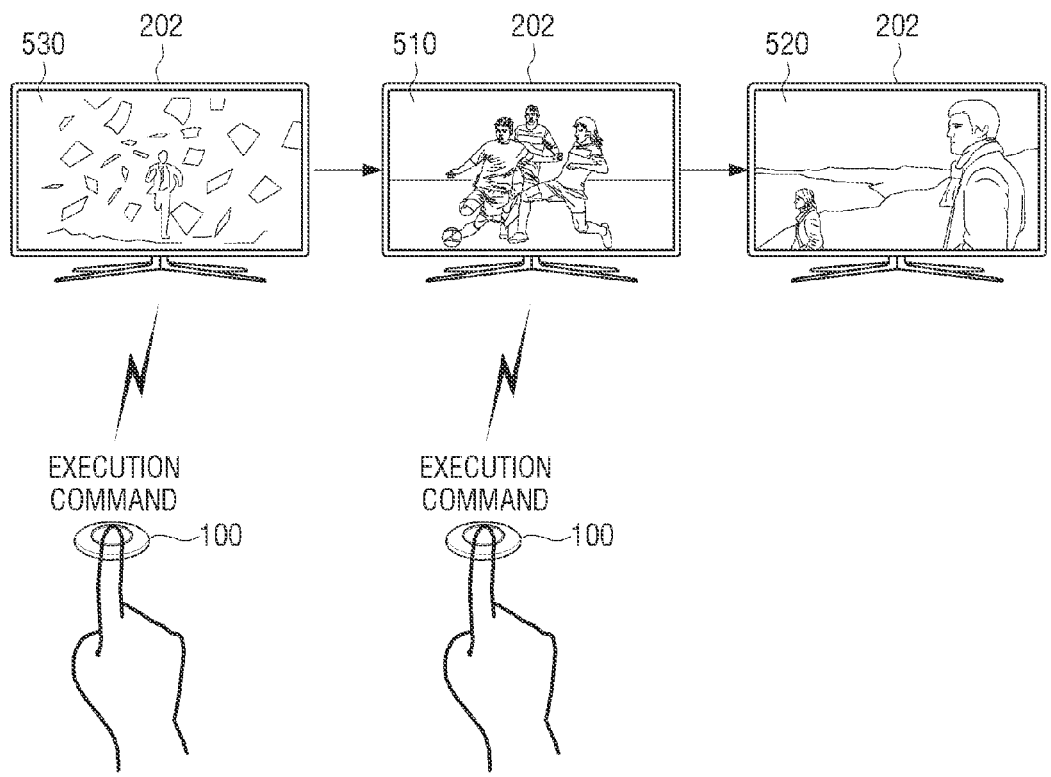

FIGS. 5A and 5B are diagrams for explanation of the case in which a plurality of preferred setting states are registered and a state is sequentially changed to the plurality of registered preferred setting states according to various embodiments of the present disclosure. In response to an execution mode entrance command for registering a preferred setting state being input through the input unit 110, the controller 130 transmits a setting start signal to the at least one device 200. While the setting mode is maintained, a setting state of the at least one device 200 may be changed to be registered as a first setting state. In addition, a setting state of the at least one device 200 may be re-changed and registered as a second setting state. In response to a setting command being input through the input unit 110, the controller 130 controls the communication unit 120 to transmit a setting end signal to the at least one device 200.

In response to an execution command being input through the input unit 110, the controller 130 may control the communication unit 120 to transmit a control command for changing the setting state of the at least one device 200 to the registered first preferred setting state. In addition, in response to an execution being re-input through the input unit 110, the controller 130 may control the communication unit 120 to transmit a control command to change the setting state of the at least one device to the registered second setting state.

The case in which a preferred channel is set in a TV will now be exemplified.

Referring to FIG. 5A, a TV 202 is set to broadcast a sports specialized channel 510. In response to a setting mode entrance command being input, the controller 130 controls the communication unit 120 to transmit a setting start signal to the TV 202. In response to a setting start signal, the TV 202 enters a setting mode. The controller 130 may control the control device 100 to blink in order to indicate that a setting mode is maintained. While the setting mode is maintained, the sports specialized channel 510 may be set as a preferred channel using a button of a TV remote controller 201. In addition, a channel may be changed using the TV remote controller 201 and then set to a preferred channel. Then, in response to a setting command being input through the input unit 110, the controller 130 transmits a setting end signal to the TV 202. In response to a setting end signal being received, the TV 202 escapes from the setting mode. In this case, a setting state for selecting the sports specialized channel 510 may be the first preferred setting state and a setting state for selecting a drama specialized channel 530 may be the second preferred setting state.

A method of receiving an additional input of the input unit 110 of the button-type control device 100 may be used as well as a method of setting a plurality of preferred channels using a preferred channel button of the TV remote controller 201. For example, when the input unit 110 is pushed a long way, the controller 130 may determine that a setting mode entrance command is input. While the TV 202 maintains a setting mode, if the input unit 110 is pushed a short way, the controller 130 may determine that an additional command of a preferred setting state is input. When a preferred setting state is additionally added as much as is desired and then the input unit 110 is re-pushed a long way, the controller 130 may determine that a setting command is input and control the communication unit 120 to transmit a setting end signal to the TV 202.

FIG. 5B illustrates the case in which the registered first preferred setting state and second preferred setting state are changed according to an embodiment of the present disclosure.

Referring to FIG. 5B, in response to an execution command being input through the input unit 110, the controller 130 may transmit a control command for changing a currently watched channel 530 to the sports specialized channel 510 corresponding to the first preferred setting state to the TV 202. For example, the controller 130 may control the communication unit 120 to transmit a control device ID to the TV 202. The setting state of the TV 202 is changed to a registered preferred setting state corresponding to the control device ID. In response to an execution command being re-input through the input unit 110, the controller 130 may transmit a control command for changing the sports specialized channel 510 to the drama specialized channel 520 corresponding to the second preferred setting state to the TV 202.

When the preferred setting state is more set than the second preferred setting state, the controller 130 may control to sequentially change the device 200 to a plurality of preferred setting states via a method of re-receiving an execution command through the input unit 110. A change order is not limited to an order of sequentially changing in response to a registered order. The controller 130 may set the change order by displaying a separate list and receiving a user input or set the change order according to a preset standard. For example, when a preferred channel is registered, channels may be sequentially changed according to the registered order, or a channel may be changed in ascending order irrespective of the registered order.

As illustrated in FIG. 5B, when only the first and second preferred setting states are registered, there may be various modified embodiments of the case in which a third execution command is input. When the first execution command is input, the controller 130 may control the communication unit 120 to transmit a control command for re-changing the drama specialized channel 520 as the second preferred setting state to the sports specialized channel 510 as the first preferred setting state. For example, the controller 130 may control the communication unit 120 to transmit a control command for restoration to a previous state of a state in which the current state is changed to first preferred setting state. That is, when a channel is changed to the drama specialized channel 520 as the second preferred setting state and then a second command is thirdly input, the controller 130 may transmit a control for restoration to the channel 530 watched before being changed to a preferred setting state.

Figure 6A:
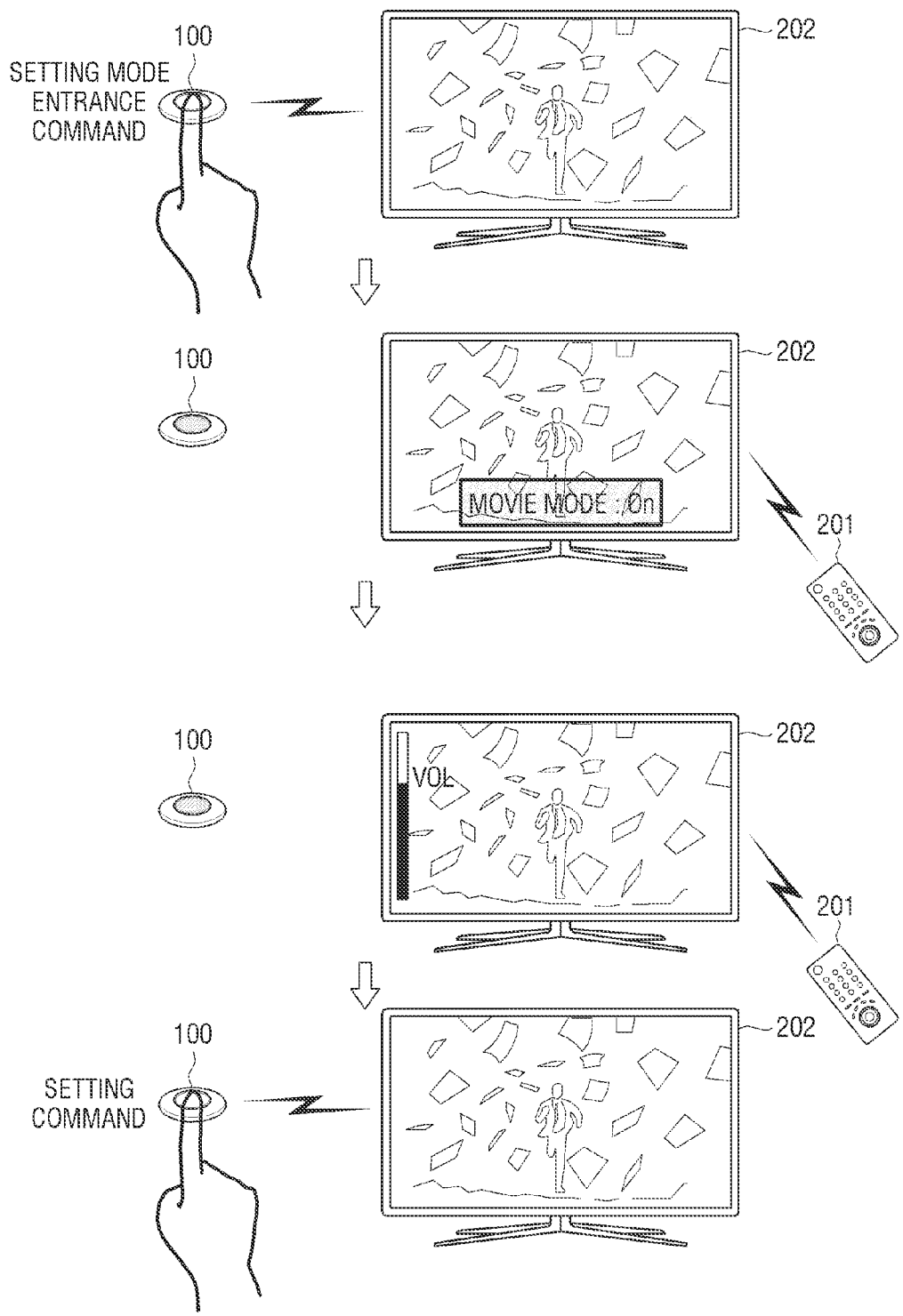
FIGS. 6A and 6B are diagrams illustrating a case in which setting states for a plurality of functions are registered according to various embodiments of the present disclosure.
Figure 6B:
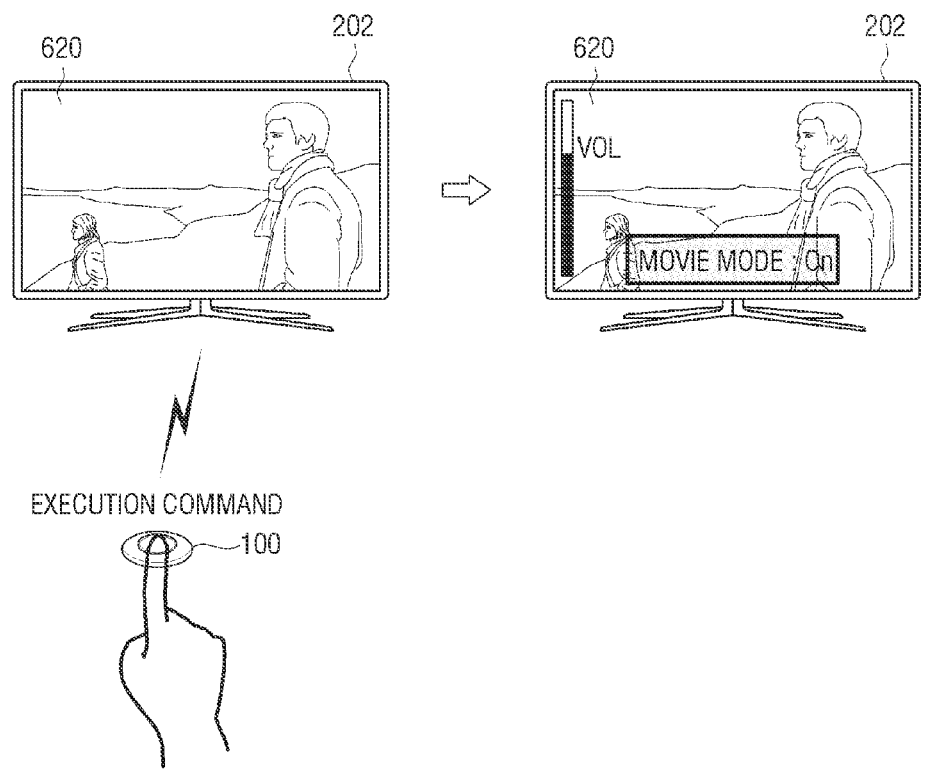

FIGS. 6A and 6B are diagrams illustrating the case in which setting states for a plurality of functions are registered according to various embodiments of the present disclosure. For example, it is assumed that a setting state of the TV 202 desired by a user uses a screen mode as a movie mode and a volume level as 10.

Referring to FIG. 6A, in response to a setting mode entrance command for registering a preferred setting state being input to the input unit 110, the controller 130 transmits a setting start signal to the TV 202 such that the TV 202 enters a setting mode. While the setting mode of the TV 202 is maintained, the control device 100 maintains a blink state in order to indicate that a setting mode proceeds. While the setting mode of the TV 202 is maintained, the setting state may be changed using a button of the TV 202 or the TV remote controller 201. The movie mode may change a screen image using the TV remote controller 201 and a volume may be controlled with a volume level of 10. Then in response to a setting command being received by the input unit 110, the controller 130 controls the communication unit 120 to transmit a setting end signal to the TV 202 as a connected device. The 'movie mode and volume 10' as a final setting state is registered in the TV 202.

Referring to FIG. 6B, in response to an execution command being input through the input unit 110, the controller 130 transmits a control command for changing to a preferred setting state to the TV 202. In response to the received control command, the TV 202 changes a setting state to 'movie mode and volume 10' as a preferred setting state. In this case, channel change is not a set preferred setting state, and thus the currently watched channel 620 is maintained and only a screen mode and volume are changed.

According to an embodiment of the present disclosure, only a final state of setting states for the same function is stored because a setting state changing process after setting mode entrance does not necessarily follow macro without change. For example, when a user wants to register setting of a volume level with 10, if a volume level is 7 during setting mode entrance, a device performs a setting state changing process of cases in which volume levels are 8, 9, and 10, respectively. For changing to the registered preferred setting state, a state as an intermediate state in which volume is 8 and 9 is not necessarily reproduced, and it is sufficient to reproduce only a state as a final state in which volume is 10. As another example, when a user intends setting of a direct change to a channel of a radio broadcasting station having a specific frequency in an audio device, a frequency scan process is not necessarily reproduced during a setting process, and it is sufficient to transmit a control command for changing to a retrieved final frequency. In this case, a setting state at setting mode entrance and a final setting state may be compared with each other to store only the changed portion. The changed portion of the setting state may be stored in each device 200, and in the case of the control device 100 including the storage 140, the changed portion may be stored in the storage 140.

The controller 130 may register and control setting of the plurality of connected devices 200 together. In response to a setting mode entrance command, the controller 130 may control the communication unit 120 to transmit a setting start signal to each of the plurality of connected devices 200. For example, signals may be sequentially transmitted to the devices 200 or signals may be simultaneously transmitted to the plurality of devices 200 using a broadcast method.

While a setting mode is maintained, if setting states of the plurality of devices 200 are changed to desired setting states and then a setting command is input to the input unit 110, the controller 130 may control the communication unit 120 to transmit a setting end signal to the plurality of devices 200. Each of the plurality of devices 200 registers a setting state at this time as a preferred setting state.

For example, when a user turns off the light to darken an environment and sets a TV to a movie mode during movie watch, if the user wants to also watch a movie next time under the same environment, the user may register the current setting state.

Figure 7A:
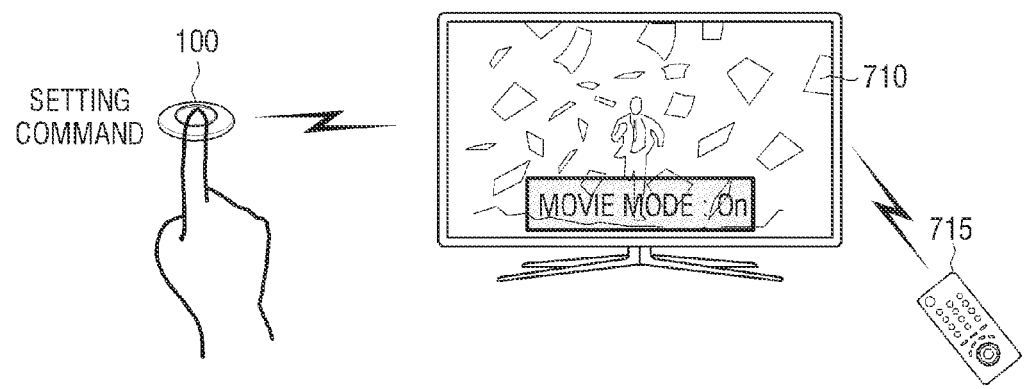
FIGS. 7A, 7B, and 7C illustrate a case in which a setting state of each of a plurality of connected devices is registered according to various embodiments of the present disclosure.
Figure 7B:
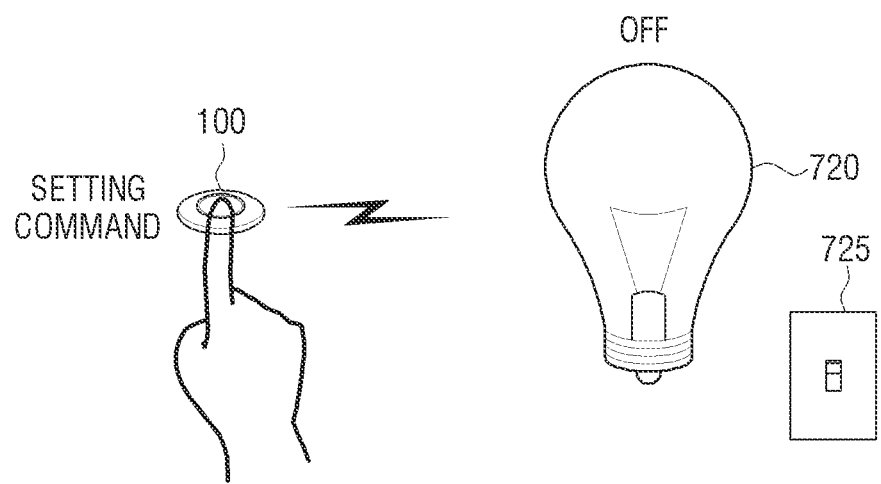
Figure 7C:
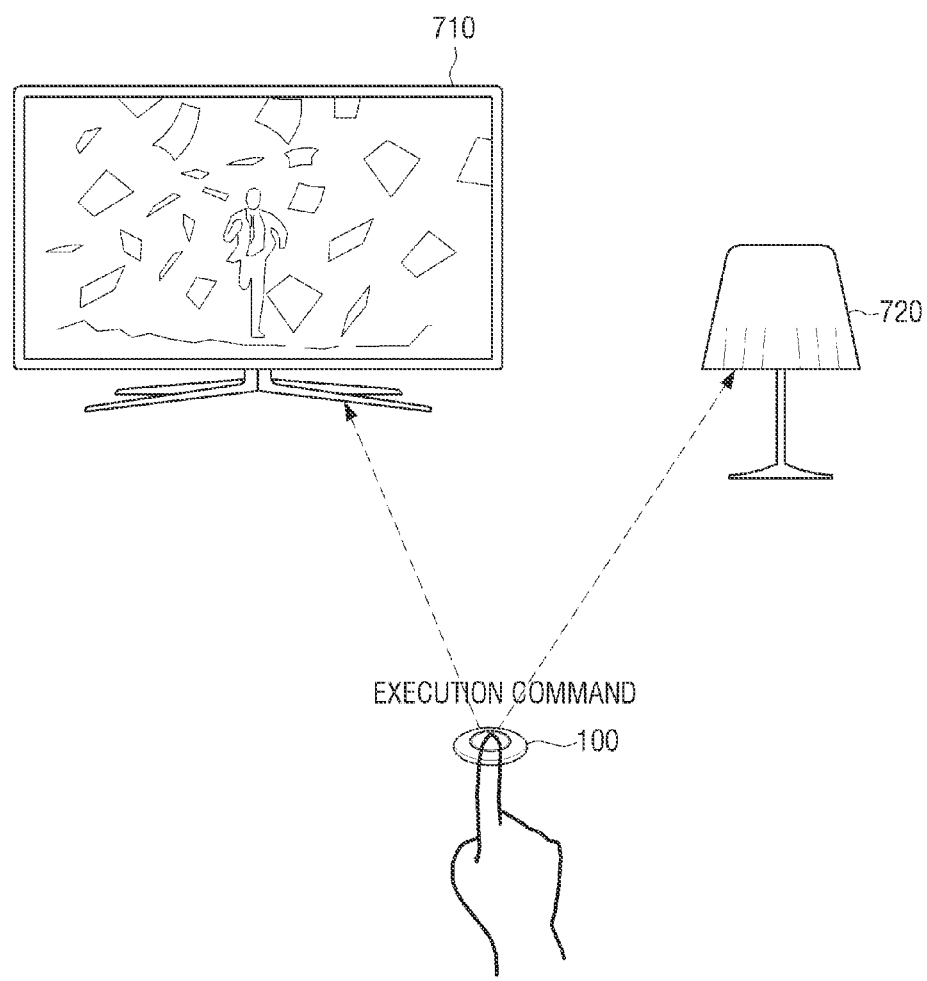

FIGS. 7A to 7C illustrate the case in which a setting state of each of a plurality of connected devices 200 is registered according to various embodiments of the present disclosure.

Referring to FIG. 7A, a watch mode of a TV 710 as a first device connected to the control device 100 may be set to a movie mode using a TV remote controller 715. Then, in response to a setting command being input, the controller 130 controls the communication unit 120 to transmit a setting end signal to the TV 710. The TV 710 that receives the setting end signal may register movie mode setting as a preferred setting state with respect to the TV 710.

Referring to FIG. 7B, a power state of an illumination apparatus 720 as a second device connected to the control device 100 may be changed to an off state using a switch 725. Then, in response to a setting command being input, the controller 130 may control the communication unit 120 to transmit a setting end signal to the illumination apparatus 720. The illumination apparatus 720 that receives the setting end signal may register a preferred setting state as a state in which power is off.

As illustrated in FIGS. 7A and 7B, the controller 130 may separately transmit a setting end signal to each of the devices 200 or may simultaneously transmit a setting start signal, a setting end signal, or the like to all the connected devices 200 via a broadcast method.

Referring to FIG. 7C, in response to an execution command being input to the input unit 110, the controller 130 may control the communication unit 120 to transmit a control command to each device 200. For example, the controller 130 may control the communication unit 120 to transmit a control device ID to each device 200. The TV 710 as the first device that receives the control command sets a watch mode as a movie mode based on the registered preferred setting state and the illumination apparatus 720 as the second device sets power to be off. As such, the user may change setting states of the plurality of devices 200 to desired setting states by simply pushing the input unit 110 of the control device 100.

Figure 8:
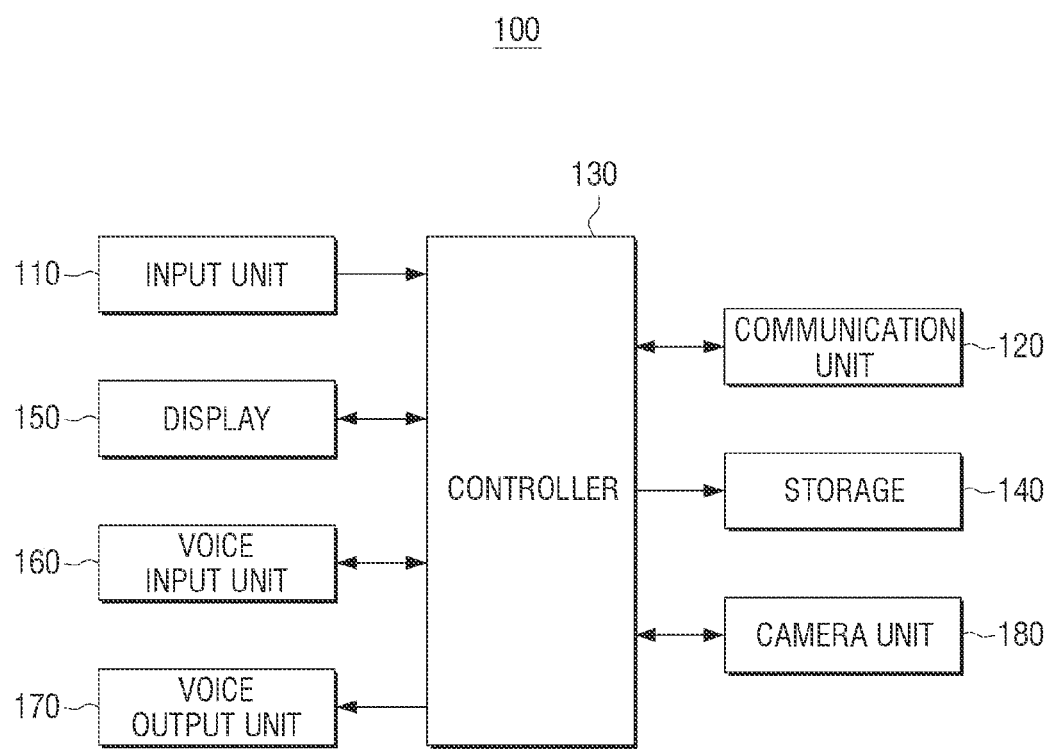
FIG. 8 is a schematic block diagram of components of a control device embodied as a smart phone according to an embodiment of the present disclosure.

FIG. 8 is a schematic block diagram of components of the control device 100 embodied as a smart phone according to an embodiment of the present disclosure.

Referring to FIG. 8, the control device 100 includes the input unit 110, the communication unit 120, the storage 140, a display 150, a voice input unit 160, a voice output unit 170, a camera unit 180, and the controller 130.

The input unit 110 may allow the control device 100 to receive a command from a user. The input unit 110 may be embodied as a button in the form of an application or widget in a mobile device such as a smart phone. For example, a shortcut icon mapped to a control command for changing to a specific preferred setting state may be generated on a background image of the smart phone.

The communication unit 120 performs a function of communication with at least one device 200. In detail, the communication unit 120 is configured with a wireless communication module to perform a wireless communication function with at least one device 200. The communication unit 120 may transmit a control device ID, a setting information request signal, a control command, and so on to at least one device 200. For example, the wireless communication method used by the communication unit 120 may be any one of NFC, wireless LAN, IR communication, ZigBee communication, Bluetooth communication, and Wi-Fi communication. When the control device 100 and the at least one device 200 are connected through wireless LAN, information about whether communication is connected needs to be transmitted and received according to a type of determined protocol for recognition between the control device 100 and the at least one device 200. To this end, a corresponding protocol may be defined through a presentation layer or an application layer at a high level in an open system interconnection (OSI) 7 layer model. The communication unit 120 may transmit and receive data using above defined protocol.

When the same communication method with the at least one device 200 is used, the communication unit 120 may communicate directly with the at least one device 200. When the communication unit 120 is not capable of communicating directly with the at least one device 200 using another communication method, the communication unit 120 may communicate directly and indirectly with at least one device through the hub 300. In this case, the communication unit 120 transmits a control command or the like to the hub 300 and re-transmits the control command received by the hub 300 to control the at least one device 200. In addition, the hub 300 may also transmit and received a control command or the like by wire with respect to a device that does not provided a wireless communication function. Accordingly, a communication method between the control device 100 and the hub 300 and a communication method between the hub 300 and the device 200 may be different. For example, when the hub 300 supports both Wi-Fi and Bluetooth low energy (BLE), the hub 300 may communicate with the control device 100 via Wi-Fi and communicate with the device 200 via BLE.

The storage 140 stores various programs and data required for an operation of the control device 100. For example, the storage 140 may store different control codes according to a type of each device. The control device 100 may generate a widget for displaying a preferred setting state and an order through a program stored in the storage 140. In addition, the control device 100 may execute the application stored in the storage 140 to generate a software virtual button for receiving a user command. The storage 140 may include a RAM and a ROM. As well known in the related art, in general, the ROM is used to uni-directionally transmit data and commands and the RAM is used to bi-directionally transmit data and commands.

The display 150 may display a preferred setting state or the like of the at least one registered device 200. The display 150 may be designed as various display panels. That is, the display 150 may be embodied using various display technologies such as organic LEDs (OLED), liquid crystal display (LCD) panels, plasma display panels (PDPs), vacuum fluorescent displays (VFDs), field emission displays (FEDs), and electro luminescence displays (ELDs). Although a display panel may be mainly embodied as an emission type display panel, a reflection type display panel (E-ink, P-ink and photonic crystal) is not excluded. In addition, the display panel may be embodied as a flexible display, a transparent display, and so on.

The display 150 is mainly provided when the control device 100 is embodied in the form of a smart phone. A registered preferred setting state may be displayed on the display 150, and when control commands are sequentially transmitted, a setting order may be displayed on the display 150. A user may visually check whether a desired setting state is registered, through the display 150. For example, the preferred setting state may be displayed in the form of widget icon corresponding thereto. In addition, when the preferred setting state is displayed in the form of shortcut icon on the display 150, if the shortcut icon is pushed, a control command may be transmitted to the at least one device 200. According to an embodiment of the present disclosure, the display 150 may receive user input through a user interface (UI) or the like provided by an application, and thus the display 150 may perform a function of the input unit 110 together. For example, a monitor of a smart hone may simultaneously perform a function of the input unit 110 and a function of the display 150.

The voice input unit 160 performs a function of receiving a voice signal. For example, instead of a method of receiving a setting command through a button, the voice input unit 160 may receive the setting command using voice. The voice input unit 160 may be embodied in the form of a small microphone of a smart phone. When an execution function is mapped to a preset voice signal, the controller 130 may control the display 150 to display a list of preset voice signals. For example, a voice signal of 'setting mode entrance' may be mapped to a 'setting mode entrance command'.

The voice output unit 170 may output a voice signal generated by the control device 100. For example, a notification message for guiding preferred state setting registration completion may be provided in the form of voice signal.

The camera unit 180 provides an image capturing function and a video capturing function. In addition, the camera unit 180 may recognize a shape of a photographed object and transmit information about the shape of the object to the controller 130. The controller 130 may analyze the shape of the object and transmit a corresponding control command to each component.

The controller 130 control other components of the control device 100, such as the input unit 110, the communication unit 120, the storage 140, and the display 150. A function of the controller 130 is the same as the above description, and thus a detailed description thereof is not repeated here.

Figure 9A:
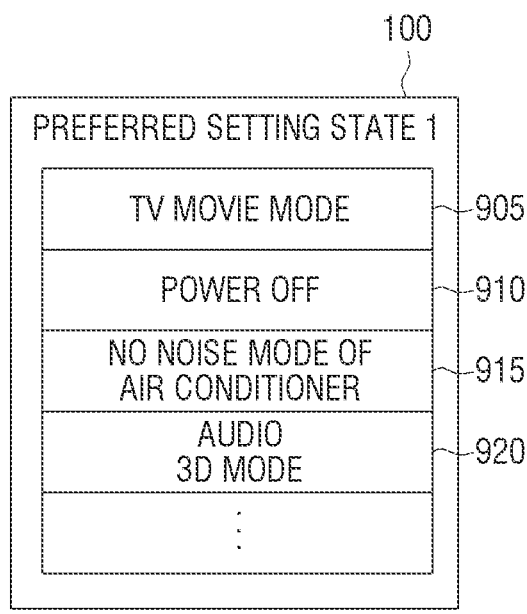
FIGS. 9A and 9B are diagrams illustrating an example in which a preferred setting state is displayed according to various embodiments of the present disclosure.
Figure 9B:
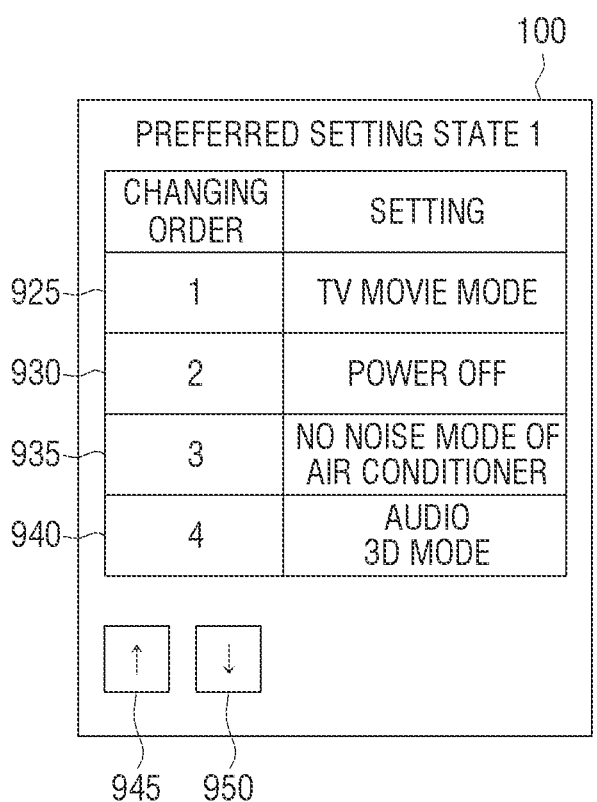

FIGS. 9A and 9B are diagrams illustrating an example in which a preferred setting state is displayed according to various embodiments of the present disclosure. The controller 130 may control the display 150 to display information of a preferred setting state or a setting state changing order, registered in the display 150, so as to each check whether a setting state intended by a user is registered. When the control device 100 is embodied not to include the display 150, the controller 130 may control the device 200 to display information of the registered preferred setting state on the device 200 that is capable of performing a display function among the at least one device 200.

FIG. 9A is a diagram illustrating an example of the control device 100 for displaying information of a preferred setting state. The controller 130 may control the display 150 to display a UI for displaying information of the preferred setting state registered in the display 150.

Referring to FIGS. 9A and 9B, the embodiment of the present disclosure will be described in terms of an example in which the control device 100 directly stores setting state information. It may be seen that setting states of four devices are registered in a registered preferred setting state 1. It may be seen that the preferred setting state 1 contains information indicating that a watch mode of a TV is set to a movie mode 905, a lamp is powered off 910, an air conditioner is set to a no noise mode 915, and audio is set to a three-dimensional (3D) mode 920. A user may check this information to recognize whether a preferred setting state is registered to correspond to a desired setting state. When setting states of some devices are not a state desired by the user, the controller 130 may control to delete or correct the corresponding portion on the UI so as to change the preferred setting state. The controller 130 may apply the corrected portion on the UI to change the registered preferred setting state. For example, when a setting state of an air conditioner is not a state desired by a user from a preferred setting state list illustrated in FIG. 9A, the controller 130 may delete a corresponding portion 915. The controller 130 may set an operation of deleting a portion from the preferred setting state list to be mapped to a specific interaction such as an operation of dragging a corresponding portion on the UI and throwing the corresponding portion out of a portion in which the list is displayed.

FIG. 9B is a diagram illustrating an example of the control device 100 for simultaneously displaying information of a preferred setting state and a registered setting state changing order. The controller 130 may control the display 150 to display a UI for simultaneously displaying the registered preferred state and the setting state changing order on the display 150. The setting state changing order refers to an order in which the controller 130 performs control to transmit control commands to the at least one device 200.

Referring to FIG. 9B, the changing order is displayed together next to the registered preferred setting state such that the controller 130 can easily and visually recognize a device to which a control command is first transmitted. As illustrated in FIG. 9B, in response to an execution command being input to the input unit 110, the controller 130 performs control to first transmit a control command for changing a watch mode to a movie mode to a TV 925, to transmit a control command for changing lamp power to an off state to the lamp 930, to transmit a control command for operating an air conditioner in a no noise mode to the air conditioner, and to lastly transmit a control command for outputting in 3D mode to an audio device 940. The controller 130 may change a setting state changing order via input received using virtual arrow buttons 945 and 950 on a UI provided on the display 150. For example, when a portion 935 associated with a preferred setting state of an air conditioner is selected and an upper arrow button 945 is pushed once, the controller 130 may control to interchange the preferred setting state 935 of the air conditioner with the preferred setting state 930 of the lamp so as to the changed turn of the air conditioner to a second turn.

As another example, specific setting state changing commands frequently need to be executed according to an order that is determined in time sequence. When there is a user command for oppositely setting a corresponding setting order on the UI, the controller 130 may control the display 150 to display an error message.

FIGS. 10A to 10E are diagrams illustrating the control device 100 using a widget icon according to various embodiments of the present disclosure.

Figure 10A:
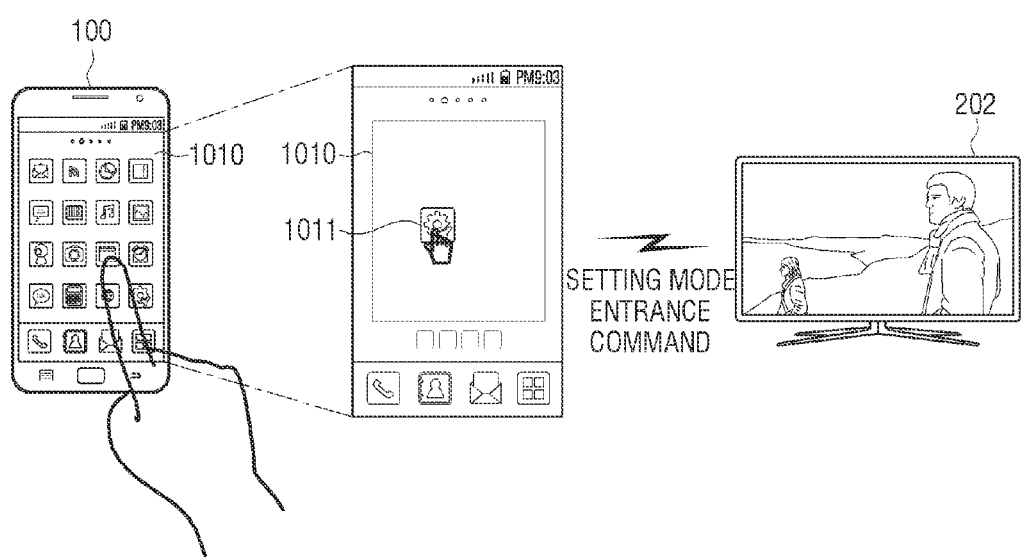
FIGS. 10A, 10B, 10C, 10D, and 10E are diagrams illustrating a control device using a widget icon according to various embodiments of the present disclosure.

Referring to FIG. 10A, in response to a user input for adding a widget icon 1011 to a display screen 1010 of a smart phone being input, the controller 130 controls the communication unit 120 to simultaneously generate the widget icon 1011 and transmit a setting start signal as a signal for allowing the TV 202 as a connected device to enter a setting mode.

Figure 10B:
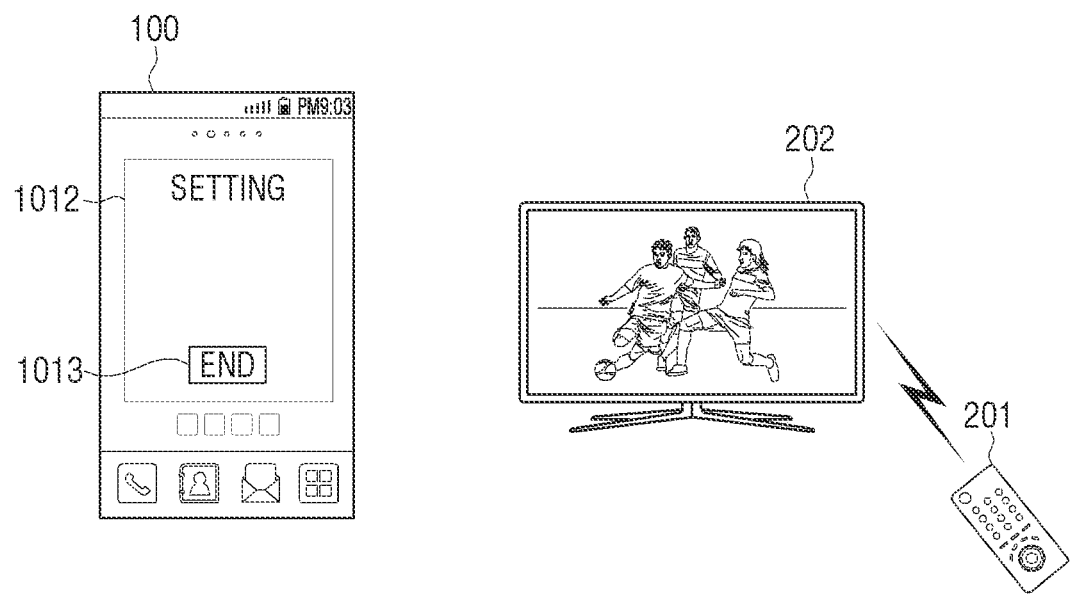

Referring to FIG. 10B, the controller 130 may control the display 150 to display a guidance message 1012 indicating that a setting mode is maintained and a UI button 1013 for inputting a setting command, on the display screen 1010. For example, when a user wants to set a shortcut function to a TV channel that broadcasts a soccer game, a channel of the TV 202 is changed to the TV channel that broadcasts the soccer game using the TV remote controller 201.

Figure 10C:
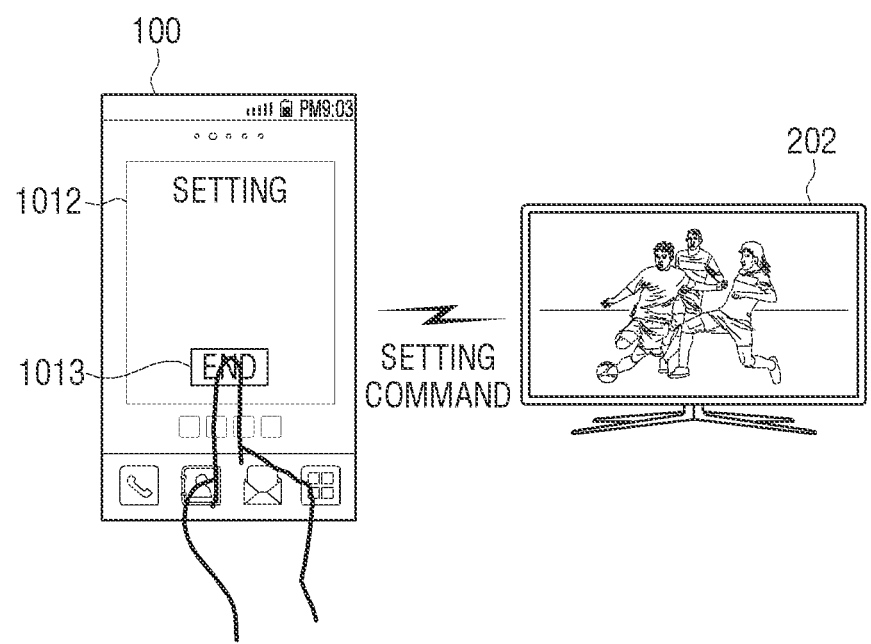

Referring to FIG. 10C, when the channel is changed and then the UI button 1013 is pushed to input a setting command, the controller 130 controls the communication unit 120 to transmit a setting end signal to the TV 202.

Figure 10D:
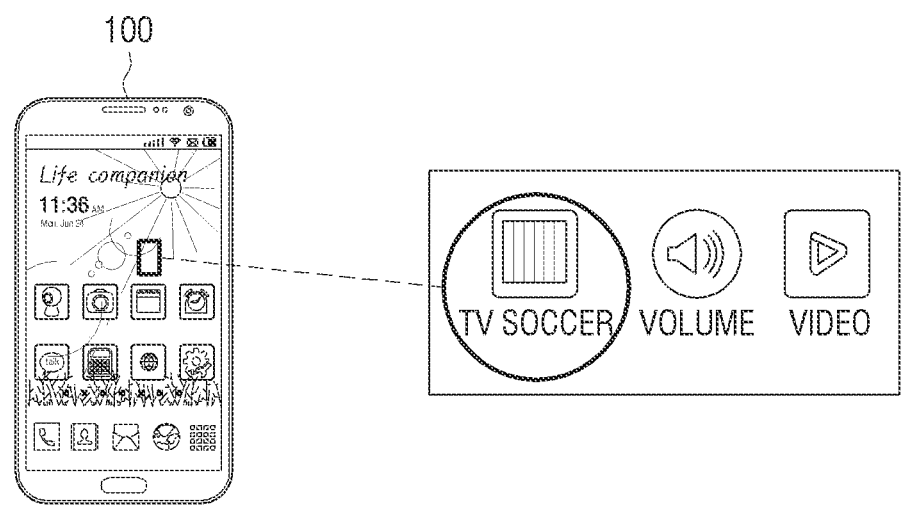

Referring to FIG. 10D, the widget icon 1011 is generated. The controller 130 may set information corresponding to the mapped signal setting state to a name of the widget icon 1011. It may be seen that the name of the widget icon 1011 of FIG. 10D is automatically set to 'TV soccer' corresponding to a function of 'shortcut to TV channel broadcasting soccer game'. As another example, the controller 130 may control the display 150 to input display information of the mapped preferred setting state to a list and display the list.

Figure 10E:
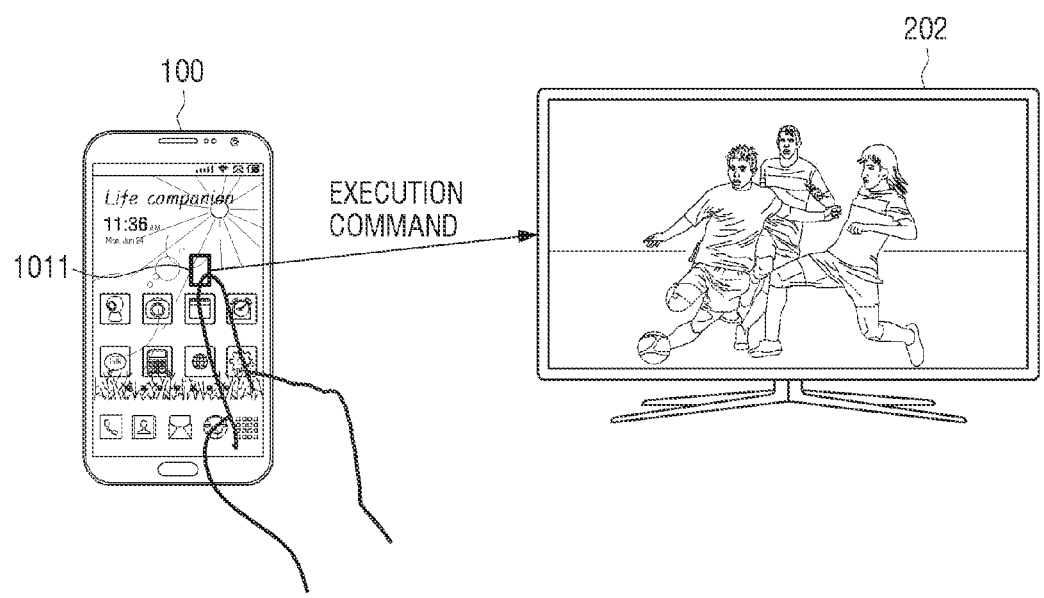

Referring to FIG. 10E, in response to the widget icon 1011 displayed on the display 150 being selected, the controller 130 may control the communication unit 120 to transmit a control command for changing to a TV channel broadcasting a soccer game to the TV 202 based on the preferred setting state mapped to the widget icon 1011. As another example, the controller 130 may transmit only simple information such as a function number mapped to the widget icon 1011 to the TV 202 and change a setting state using the stored preferred setting state based on the information transmitted from the TV 202.

In addition to the aforementioned embodiments of the present disclosure, various scenarios in which the control device 100 controls the at least one device 200 to perform a function corresponding to a setting state defined by a user using the control device 100 may be considered.

FIGS. 11 to 14 are diagrams illustrating various scenarios in which a control device controls at least one device to perform a function corresponding to a setting state defined by a user using the control device according to various embodiments of the present disclosure.

Figure 11:
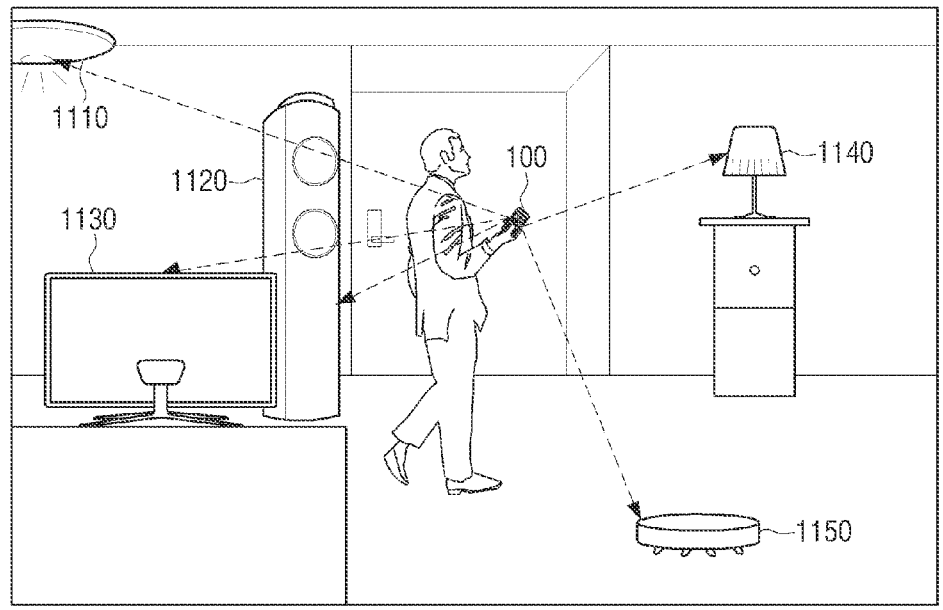

Referring to FIG. 11, the controller 130 may transmit a control command for power off via simple manipulation when a user is not at home to a lamp 1110, an air conditioner 1120, a TV 1130, an illumination apparatus 1140, and a robot cleaner 1150 as various devices used at user's home. According to the various embodiments of the present disclosure, the user may power off all devices while is not at home without examining devices distributed at various locations one by one or using a plurality of remote controllers. As another example, without direct communication with each device, the controller 130 may provide the same preferred setting state via a method of controlling the communication unit 120 to communicate with the hub 300 of a home network.

According to an embodiment of the present disclosure, the control device 100 may set a button mapped to specific content and provide a function associated with the specific content via only an operation of pushing the set button. The button mapped to the specific content may be a physical button but may be embodied as a virtual button, a widget, an icon, and so on, which are provided in terms of software.

Referring to FIG. 12, the controller 130 may set a button mapped to a TV series associated with a horse. The preferred setting state registered by the controller 130 may be setting for changing to a TV channel broadcasting a TV series or setting for connection to a service for providing a video on demand (VOD) such as Internet protocol TV (IPTV) to browse a page of the TV series. For example, when the controller 130 is connected to a service for providing a VOD, the controller 130 may perform setting so as to allow watching immediately after watching is completed via only button manipulation using a method of storing a time point when watching is completed and updating a preferred setting state.

According to an embodiment of the present disclosure, the control device 100 may transmit a control command for executing the same function to the plurality of devices 200.

Figure 13:
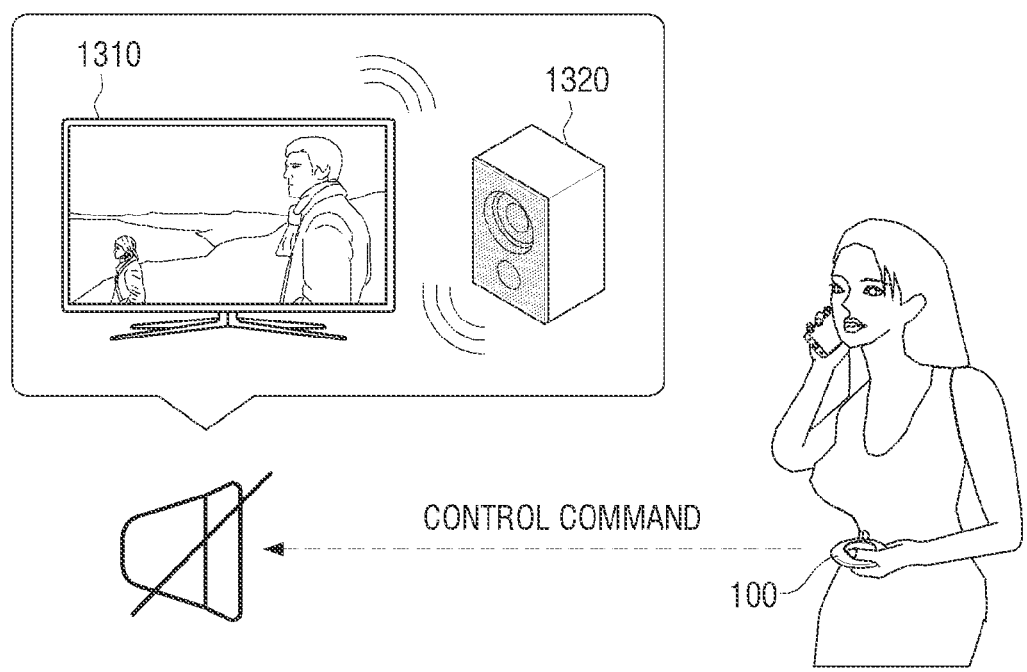

Referring to FIG. 13, a TV 1310 and an audio device 1320 are outputting a voice signal. When surrounding noise needs to be reduced, for example, when there is a phone call for a user that is watching the TV 1310, the controller 130 may control the communication unit 120 to transmit a control command for allowing the TV 1310 and the audio device 1320 as a plurality of devices to enter a mute mode as the same operation. When different devices use the same control command with respect to the same function, the controller 130 may transmit a corresponding control code without a signal for identifying a special device so as to control a plurality of devices. When devices use different control codes, the controller 130 may control a plurality of devices using a method of registering a mute state as a preferred setting state. Although FIG. 13 illustrates the case in which the control device 100 is embodied as small size button, when the control device 100 is embodied as a smart phone, a button provided on a display of the smart phone may be clicked to change the TV 1310 and the audio device 1320 to a mute mode and then a call button may be pushed to perform phone call.

Figure 14:
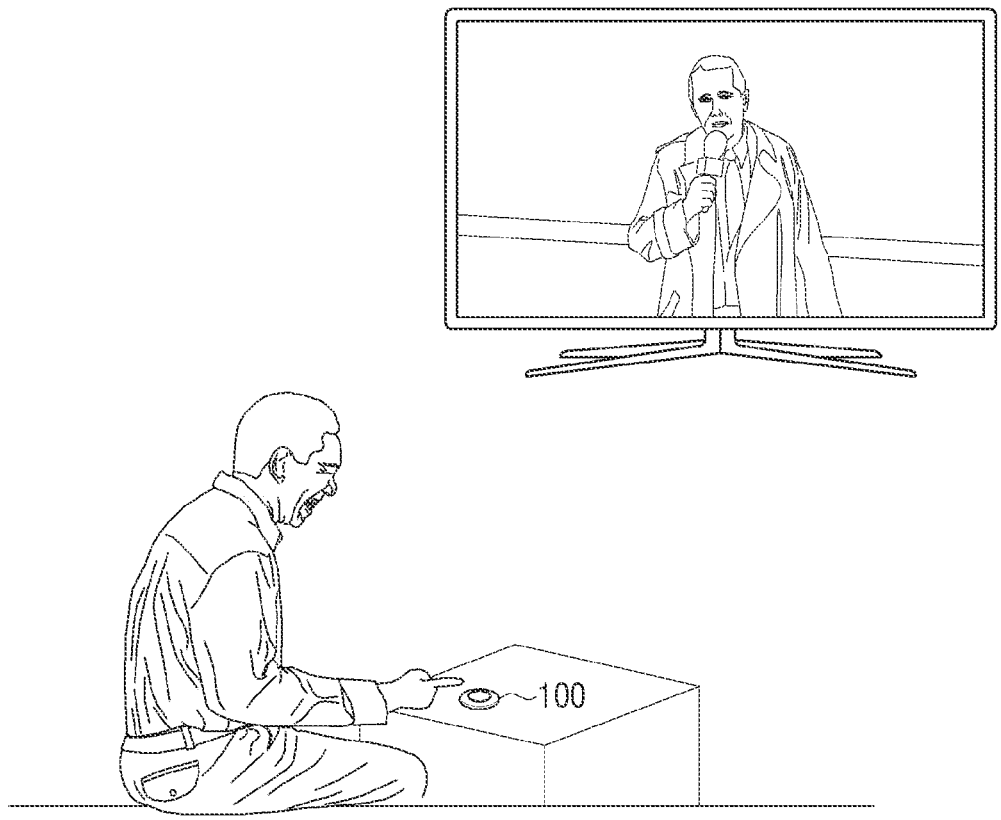

FIG. 14 is a diagram illustrating an example in which the button type control device 100 is particularly and usefully used according to an embodiment of the present disclosure. The button type control device 100 is most advantageous in terms of simple manipulation. A control device embodied as a smart remote controller or a smart phone may be simple and convenient to people who are accustomed to an electronic device but may be more complicated or inconvenient to a class of people who are not accustomed to an electronic device than a remote controller of the related art. However, the button type control device 100 may provide convenience to people that are not accustomed to an electronic device, such as elderly people in that a device may be controlled by simply clicking a button.

Referring to FIG. 14, the controller 130 may control to increase a volume level or convert a watching mode to a silver mode by simply clicking the input unit 110 of the button type control device 100. For a class of users who feels a manipulation operation of registering a preferred setting state to be difficult, a device manufacturer may provide the button type control device 100 with a preregistered preferred setting state at time of purchase or separately.

As another implementable scenario, a scenario of registering and using preferred channels desired by respective families in different button type control devices 100 or a scenario of powering off the plurality of devices 200 at a living room while going to bed using the button type control device 100 attached to a side of the bed may be considered. As another example, when the input unit 110 of the button type control device 100 installed in a porch is clicked while entering home in summer, the controller 130 may control the communication unit 120 to transmit a control command so as to operate an air conditioner in a turbo mode and to also transmit a control command for displaying a notification message received through a home network to a display device.

Hereinafter, a method of controlling a control device will be described with reference to FIGS. 15 to 17.

Figure 15:
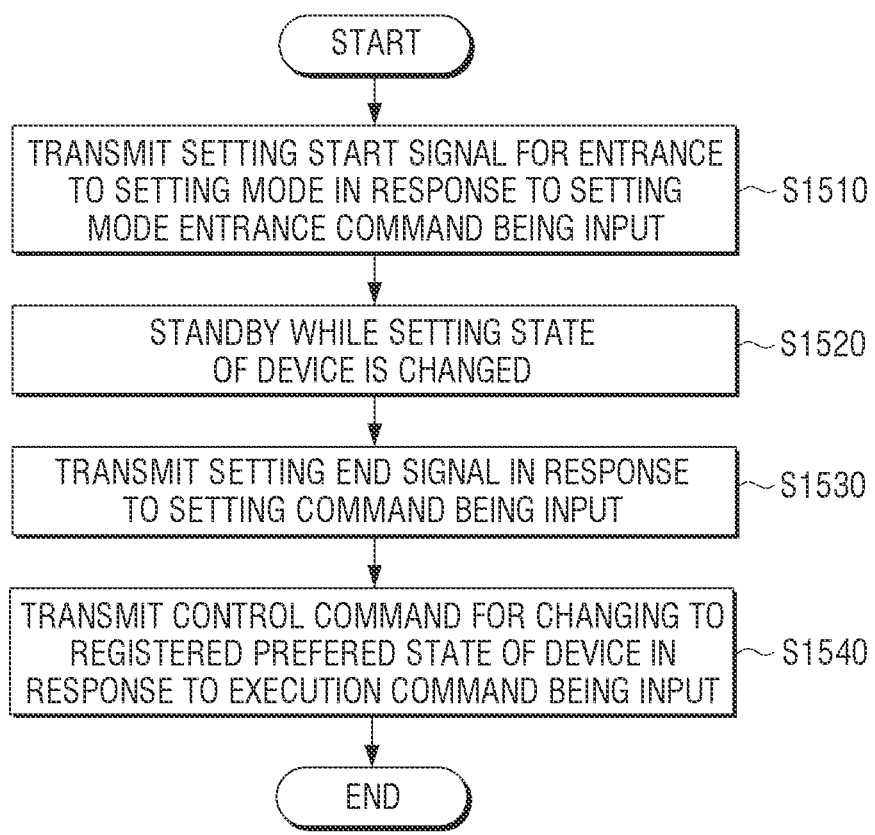
FIGS. 15, 16, and 17 are flowcharts for explanation of a method of controlling a control device according to various embodiments of the present disclosure.

FIG. 15 is a flowchart for explanation of a method of controlling the control device 100 according to an embodiment of the present disclosure.

Referring to FIG. 15, first, in response to a setting mode entrance command being input, the control device 100 transmits a setting start signal for allowing the at least one device 200 to enter a setting mode at operation S1510. The at least one device 200 that receives the setting start signal enters the setting mode. The control device 100 is on standby while a setting state of the at least one device 200 is changed at operation S1520. In order to indicate that the at least one device 200 maintains a setting mode, the control device 100 may blink. The control device 100 including a display may display a guidance message such as 'setting is proceeding.' on the display. While the setting mode is maintained, a setting state of the device 200 may be changed using a button or remote controller of the at least one device 200 like a setting method of the related art.

After a setting state is completely changed, the control device 100 receives an execution command. In addition, in response to the execution command being input, the control device 100 transmits a setting end signal to the at least one device 200 at operation S1530. The setting end signal is a signal for allowing the at least one device 200 to escape from the setting mode. The control device 100 may transmit a control device ID together at operation S1510 of transmitting a setting start signal or operation S1530 of transmitting a setting end signal. The at least one device 200 may map and store the registered preferred setting state and control device ID.

In response to an execution command being input, the control device 100 transmits a control command for changing the at least one device 200 to the preferred setting state at operation S1540. For example, the control command may include a control device ID. The at least one device 200 receives the control device ID and determine a state as the mapped preferred setting state. In addition, the at least one device 200 changes a setting state to the determined preferred setting state.

Figure 16:
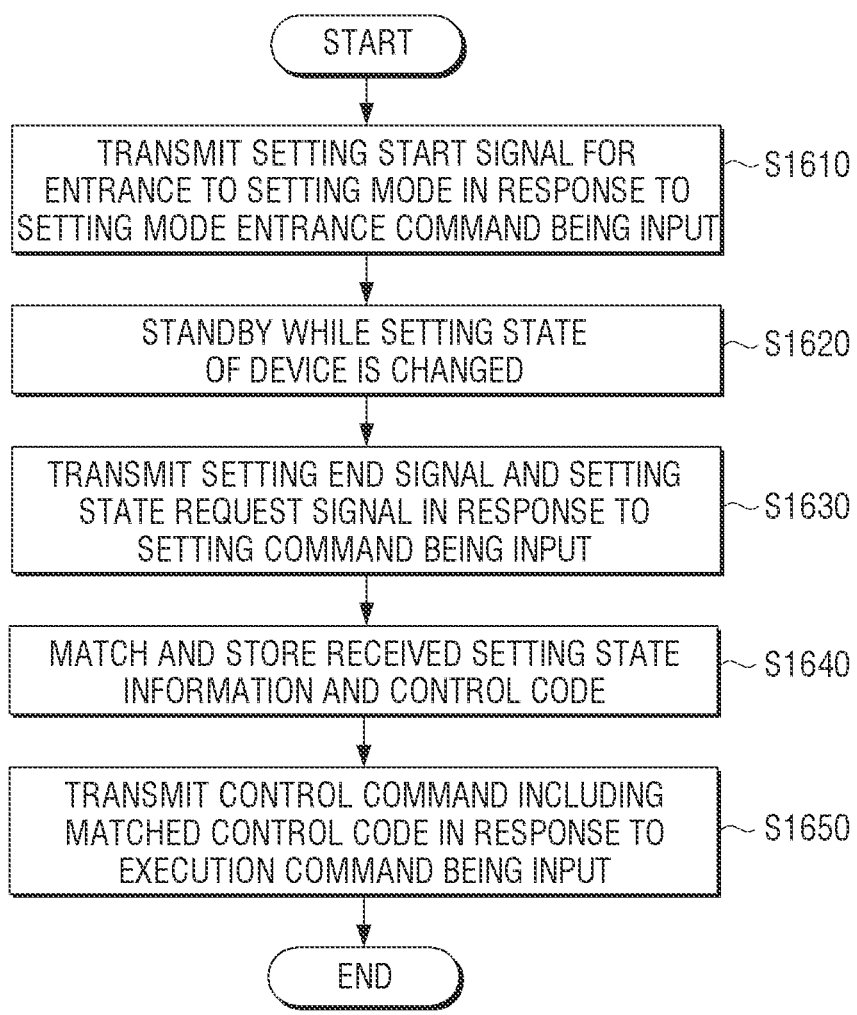

FIG. 16 is a flowchart for explanation of a method of controlling the control device 100 according to an embodiment of the present disclosure.

Referring to FIG. 16, in response to a setting mode entrance command being input, the control device 100 transmits a setting start signal for allowing the at least one device 200 to enter a setting mode at operation S1610. The device 200 that receives the setting start signal enters the setting mode. The control device 100 is on standby while a setting state of the at least one device 200 is changed at operation S1620. Like in the embodiment of the present disclosure described with reference to FIG. 15, a blink signal, a guidance message, and so on may indicate that the at least one device 200 maintains a setting mode. While the setting mode is maintained, the setting state of the device 200 may be changed using a button or a remote controller of the at least one device 200 like a setting method of the related art. As another example, the setting state of the at least one device 200 may be changed using the control device 100 according to a control code or the like pre-stored in the control device 100.

In response to a setting command being input after a setting state is completely changed, the control device 100 transmits a setting end signal and a setting stat request signal to the at least one device 200 at operation S1630. The setting end signal is a signal for termination of maintaining a setting mode by the at least one device 200. The setting state request signal may be a command for transmitting setting state information of the at least one of device 200 changed while the setting mode is maintained. The setting state request signal may be a command for transmitting a device ID of each device 200 together with the changed setting state information.

The control device 100 may match a finally changed setting state of the received at least one device 200 with a control code and store the result information at operation S1640. FIG. 16 is different from FIG. 15 in that the control device 100 stores a preferred setting state.

In response to an execution command being input, the control device 100 transmits a control command including the matched control code to the at least one device 200 at operation S1650. The execution command may be a user input that makes the control device 100 transmit a control command to the at least one device 200. The control command may be generated by matching the device ID, the setting state information, and a control code for changing a setting state, received from the at least one device 200. When control codes used by a plurality of devices are different, a control code corresponding to a specific function of a specific device may be recognized using the device ID. The at least one device 200 may receive a control command from the control device 100 and change setting to the registered preferred setting state. Accordingly, the user may register an arbitrary desired setting state and may easily change setting of the at least one device 200 at a desired time point using a setting state registered in the control device 100.

Figure 17:
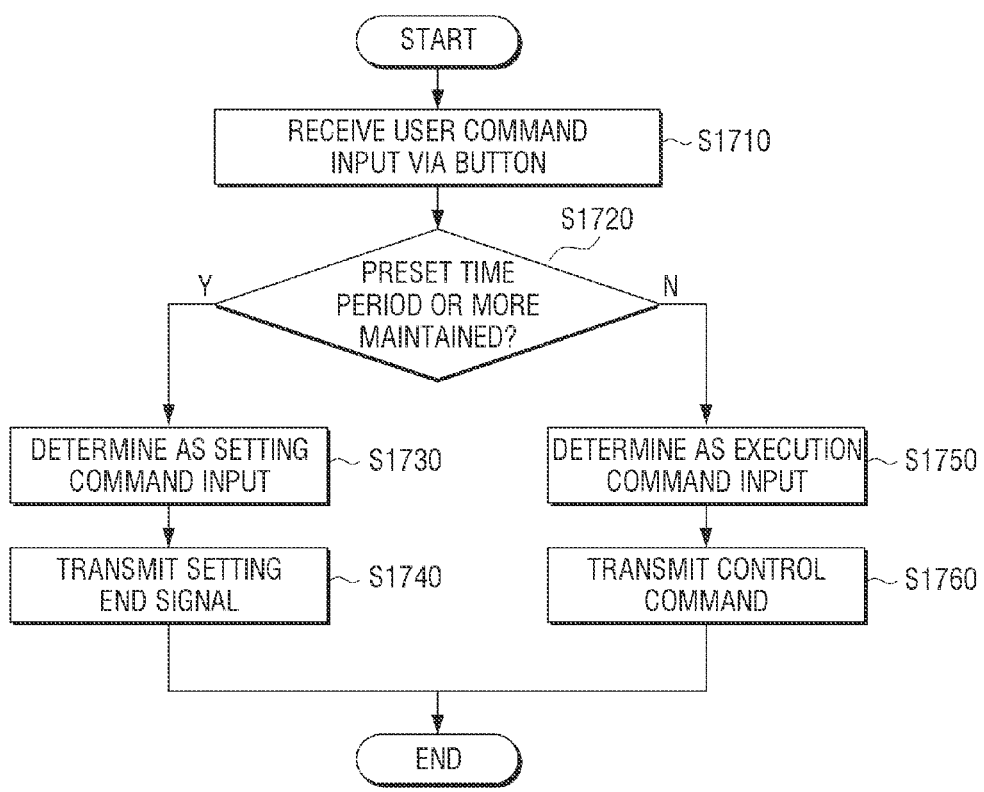

FIG. 17 is a flowchart for explanation of the control device 100 that determines that different commands are input according to time of inputting a button according to an embodiment of the present disclosure.

Referring to FIG. 17, a user command is input to the control device 100 via a button at operation S1710. The button may be a physical button disposed on a remote controller of the related art or a virtual button provided in terms of software. Alternatively, the button may be a button-type small-size remote control device. By changing an input method, although one button is used, the control device 100 may differentiate various input signals. The control device 100 determines whether a time period when the button is pushed and maintained is a preset time period or more at operation S1720. When the button is pushed for a preset time period or more at operation S1720-Y, the control device 100 may determine that the setting command is input. Accordingly, the setting command is input to the control device 100 at operation S1730. The control device 100 transmits a setting end signal to the at least one device 200 according to a first input command at operation S1740. On the other hand, when button is pushed and maintained for only a time period smaller than a preset time period at operation S1720-N, a control device may determine that the execution command is input. Accordingly, the execution command is input to the control device 100 at operation S1750. According to the input execution command, the control device 100 transmits a control command for changing a setting state to the preferred setting state registered in the at least one device 200 at operation S1760. A method of receiving different commands using the same button may be provided via a different method from the aforementioned method. For example, assuming a virtual button provided in terms of software, the virtual button may be set in such a way that a setting command is input to the control device 100 when a button on a UI is dragged to the right from a reference point, and an execution command is input to the control device 100 when the button is dragged to the left form the reference point.

Through the aforementioned control method, the control device 100 may generate a control command for executing a plurality of functions of the plurality of devices 200 once and transmits the control command to the plurality of devices 200.

Hereinafter, a sequence of an integrated control system will be described with reference to FIGS. 18 and 19.

Figure 18:
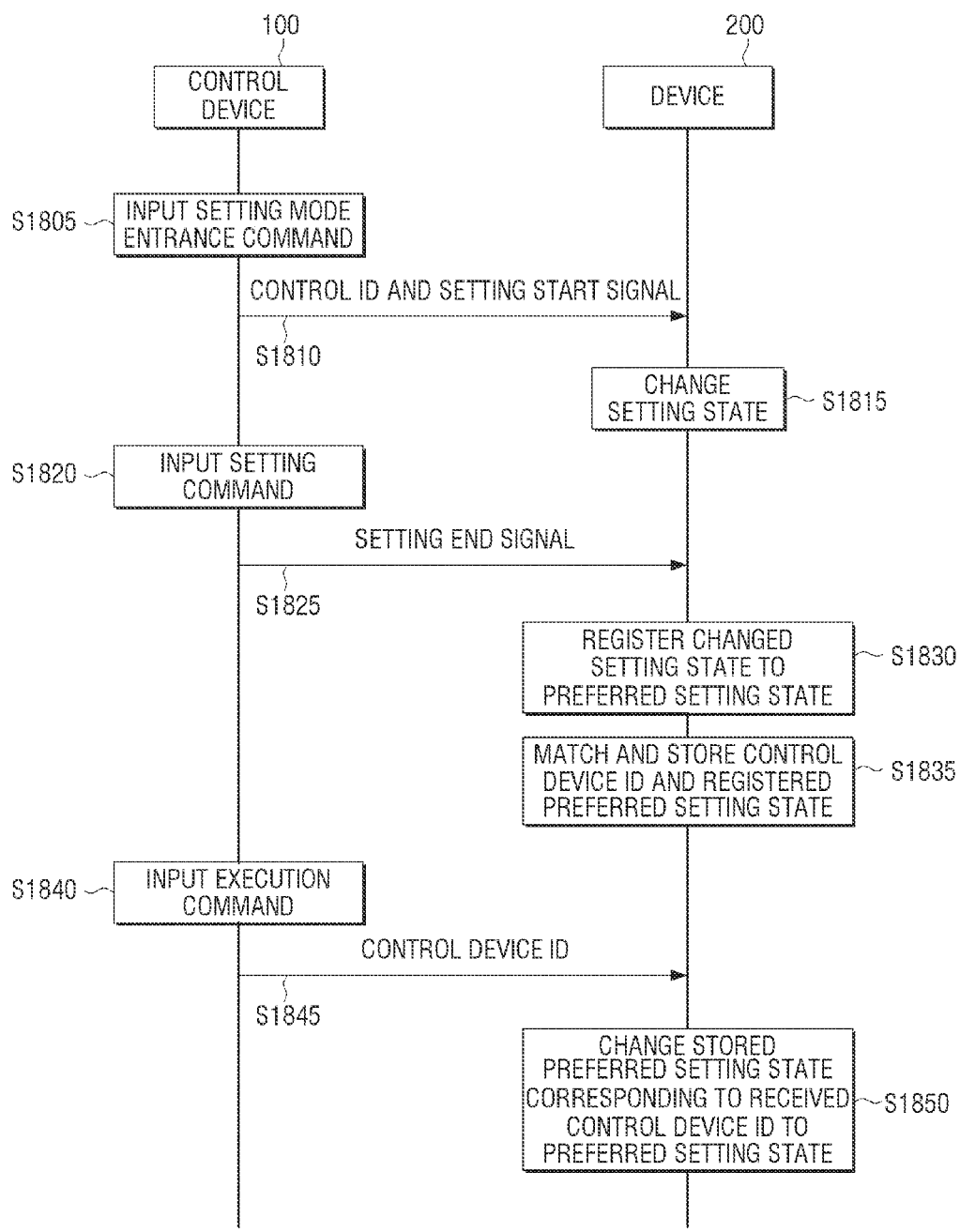
FIGS. 18 and 19 are sequence diagrams for explanation of an integrated control system according to various embodiments of the present disclosure.

FIG. 18 is a sequence diagram illustrating a sequence of an integrated control system configured in such a way that the control device 100 transmits only a signal and each device 200 stores and executes a setting state according to an embodiment of the present disclosure. This embodiment of the present disclosure may be particularly applied when the button type control device 100 is used. A setting mode required at a specific site may be mapped to control device ID information and stored in the device 200, and the control device 100 may transmit a signal such as control device ID information and execute a function stored in the device.

Referring to FIG. 18, the integrated control system may change a setting state of the device 200 in the following order. First, a setting mode entrance command for allowing the device 200 to enter a setting mode is input to the control device 100 at operation S1805. The control device 100 transmits the control device ID and the setting start signal to the device 200 at operation S1810. The device 200 changes a setting state to an arbitrary desired state at operation S1815. The setting state is changed to a desired setting state through a button or a remote controller of the device 200. After the setting state of the device 200 is completely changed to an arbitrary desired setting state, a setting end command is input to the control device 100 at operation S1820.

In response to the setting end command being input, the control device 100 transmits a setting end signal to the device 200 at operation S1825. The control device 100 may transmit the control device ID together with the setting end signal instead of transmitting the setting start signal together. The device 200 registers the changed setting state as a preferred setting state in response to the setting end signal at operation 51830. That is, the device 200 may register a setting state changed during time between the setting start signal and the setting end signal as the preferred setting state.

In addition, the device 200 may map the registered preferred setting state and the control device ID and store the result information at operation S1835. For mapping a specific preferred setting state for each control device 100, the device 200 maps the received control device ID and the registered preferred setting state. For example, a user may input the setting mode entrance command to a first control device, change a channel of a TV, and then input a setting command. In addition, a user may input a setting mode entrance command to a second control device, change a volume of the TV, and then input a setting command. A control command for changing a channel to a set channel may be mapped to an ID of the first control device and stored in the TV, and a control command for changing a volume to a set volume may be mapped to an ID of the second control device and stored in the TV. In the future, when the user inputs an execution command to the first control device, the channel of the TV may be changed, and when an execution command is input to the second control device, the volume of the TV may be changed. Accordingly, the user may map a plurality of control devices to respective desired functions.

An execution command for changing to a stored preferred setting state is input to the control device 100 at operation S1840. In response to the execution command being input, the control device 100 transmits a control device ID to device 200 at operation S1845. The device 200 determines whether a preferred setting state mapped to the received control device ID is present. When the preferred setting state corresponding to the received control device ID is present, the device 200 changes a current setting state to the stored preferred setting state at operation S1850.

Figure 19:
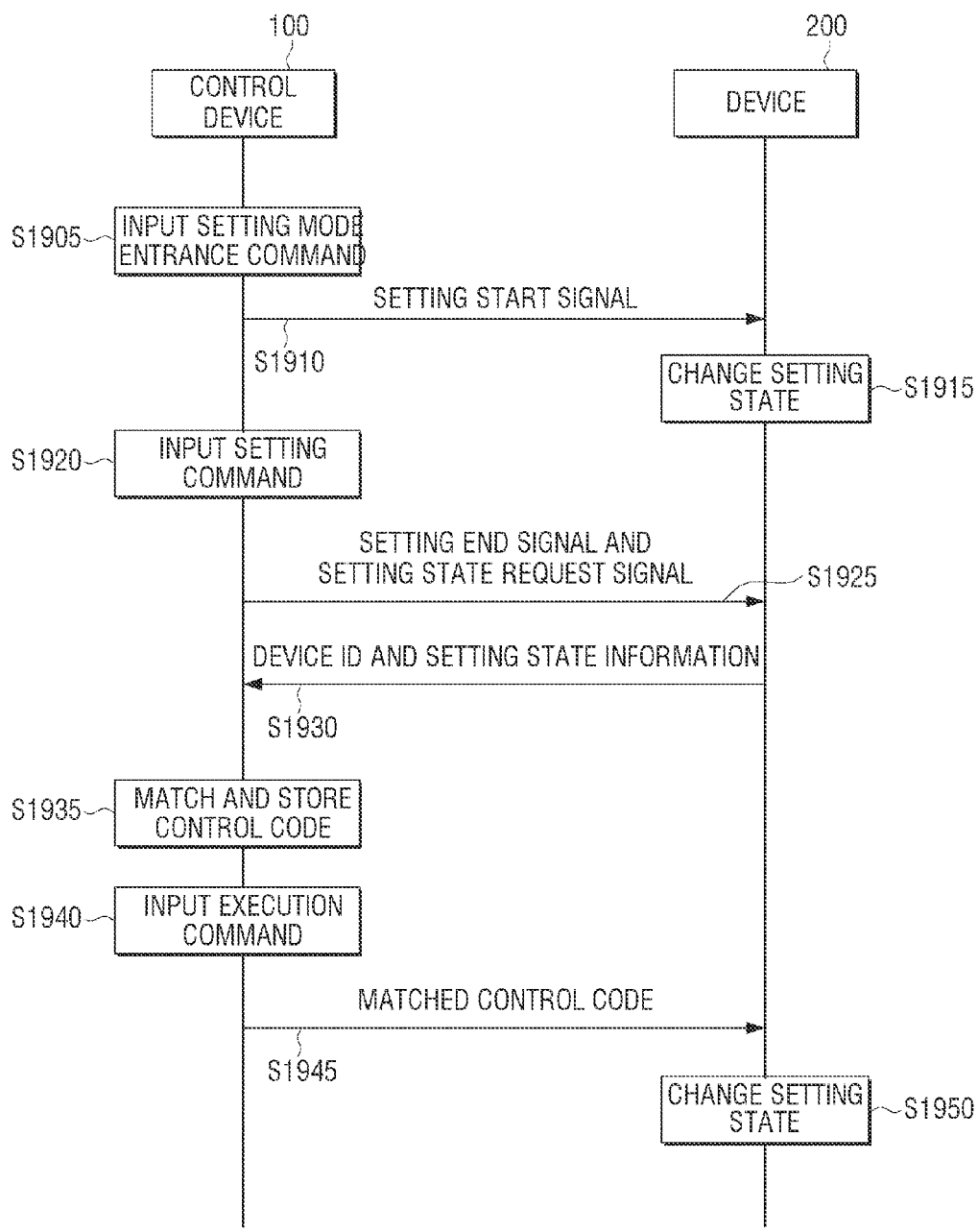

FIG. 19 is a sequence diagram of a sequence of an integrated control system configured in such a way that the control device 100 stores set information and transmits a control command to the device 200 according to an embodiment of the present disclosure.

Referring to FIG. 19, the integrated control system may change a setting state of the device 200 in the following order. First, a setting mode entrance command for allowing the device 200 to enter a setting mode is input to the control device 100 at operation S1905. The control device 100 transmits the setting start signal to the device 200 at operation S1910. The device 200 that receives the setting start signal enters a setting mode. While the setting mode is maintained, the device 200 may change the setting state to an arbitrary state desired by the user at operation S1915.

After the setting state of the device 200 is completely changed, a setting command is input to the control device 100 at operation S1920. In response to the setting command being input, the control device 100 transmits a setting end signal and a setting state request signal to the device 200 at operation S1925. The setting end signal is a signal that allows the device 200 to escape from the setting mode. The setting state request signal is a signal for requesting the setting state of the device 200 at a time point when the setting command is input. In response to the request signal, the device 200 transmits a device ID and setting state information to the control device 100 at operation S1930. The device 200 may transmit a control code for changing the setting state of the device 200 to the control device 100 together. The control device 100 registers a preferred setting state based on the received setting state information. The control device 100 matches the received setting state information, a device ID, and a control code for changing the setting state and stores the result information at operation S1935.

In order to change the setting state of the device 200 to a registered preferred setting state, an execution command is input to a control device at operation S1940. In addition, in response to the input execution command, the control device 100 transmits the matched control code to the device 200 at operation S1945. The matched control code contains a control code for changing a setting state like a setting state registered in the device 200. The device 200 receives a control command including the matched control code and changes the setting state to correspond to the registered preferred setting state at operation S1950.

Figure 20:
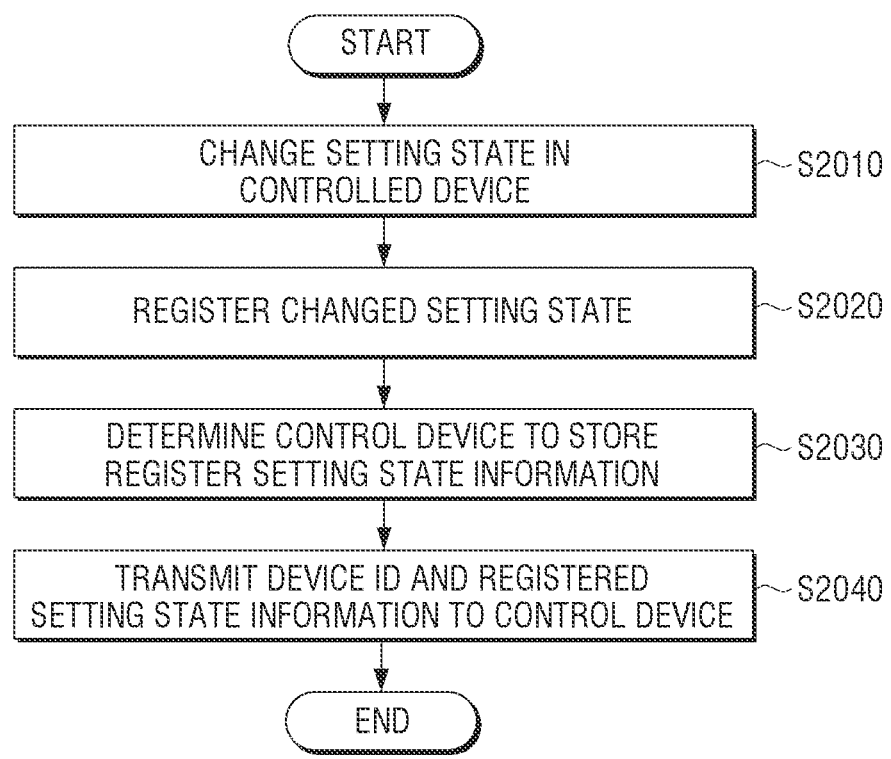
FIG. 20 is a flowchart for explanation of a control method according to an embodiment of the present disclosure.

FIG. 20 is a flowchart for explanation of a control method according to an embodiment of the present disclosure.

Referring to FIG. 20, a controlled device directly generates a control command and transmits and sets the control command to a control device. The controlled device directly changes the setting state at operation S2010. The controlled device directly registers the changed setting state to a preferred setting state at operation S2020. A setting state changed during time between the setting mode entrance and setting mode end may be registered. Then, the controlled device determines a control device that will store the registered preferred setting state information at operation S2030. That is, the device generates a control command and then transmits the control command. The device transmits the device ID and the registered preferred setting state information to the determined control device at operation S2040.

A program code for execution of the aforementioned methods according to various embodiments of the present disclosure may be stored in various types of non-transitory recording media. In detail, the program code may be stored in various types of recording media readable by a terminal, such as a RAM, a flash memory, a ROM, an erasable programmable ROM (EPROM), an electronically erasable and programmable ROM (EEPROM), a register, a hard disk, a removable disk, a memory card, a universal serial bus (USB) memory, and compact disc ROM (CD-ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a control device, the method comprising:
receiving a first user command by a first button included in the control device;
transmitting a first control command for entering a setting mode to at least one of a plurality of external devices based on the received first user command;
receiving a second user command by a second button included in the control device while the setting mode of the at least one external device is maintained;
transmitting a second control command for registering a setting state of the at least one external device, at a time point when the second control command is received at the at least one external device, to the at least one external device based on the received second user command;
receiving a third user command by a third button included in the control device;
transmitting a third control command, for changing a current setting state of the at least one external device to the registered setting state, to the at least one external device based on the received third user command; and
obtaining order information based on the registered setting states of at least two external devices,
wherein the transmitting of the third control command comprises transmitting sequentially the third control command to the at least two external devices based on the order information.

2. The method of claim 1, further comprising:
in response to a setting mode entrance command for registering the setting state being input, transmitting a setting start signal for allowing the at least one external device to enter a setting mode for registering the setting state; and in response to the second control command being input after a setting state of the at least one external device is changed while the setting mode is maintained, registering a finally changed setting state of the at least device as the setting state of the at least one external device.

3. The method of claim 1, further comprising:
in response to the second control command being input, transmitting a setting end signal to the at least one external device, and
wherein the setting end signal is a signal for storing a setting state at a time point when the at least one external device receives the setting end signal.

4. The method of claim 1, further comprising:
in response to a setting mode entrance command for registering a setting state being input, transmitting a setting start signal for allowing the at least one external device to enter a setting mode for registering the setting state;
in response to a setting state additional command while the setting mode is maintained, registering a first setting state of the at least one external device as a first setting state; and
in response to the setting state additional command being re-input after a setting state of the at least one external device is changed to a second setting state from the first setting state, registering the second setting state of the at least one external device as a second setting state.

5. The method of claim 4, wherein the transmitting comprises:
in response to an execution command being input, transmitting a control command for changing a setting state of the at least one external device to the registered first setting state; and
in response to the execution command being re-input, transmitting a control command for changing a setting state of the at least one external device to the registered second setting state.

6. The method of claim 1, further comprising:
registering a setting state changing order of the at least one external device together,
wherein the transmitting of the third control command comprises sequentially transmitting the third control command to the at least one external device based on the registered setting state changing order.

7. The method of claim 1, further comprising:
in response to the second control command being input, transmitting a setting end signal and a setting state request signal to the at least one external device; and
in response to a device identifier (ID) and setting state information being received from the at least one external device in response to the setting end signal, matching and storing the device ID, the received setting state information, and a control code for changing a setting state.

8. The method of claim 1, further comprising:
in response to an operation of generating a widget icon being input, transmitting a setting start signal for allowing the at least one external device to enter a setting mode, to the at least one external device;
displaying a user interface (UI) including a guidance message and a second control command input button; and
in response to the second control command being input through a second control command input button included in the UI after a setting state of the at least one external device is changed, transmitting a setting end signal to the at least one external device and displaying the generated widget icon,
wherein the transmitting of the third control command comprises transmitting the third control command to the at least one external device in response to the widget icon being selected.

9. The method of claim 1,
wherein the second control command is transmitted in response to the second button being pushed for a preset time period or more, and
wherein an execution command is transmitted when the second button is pushed for a period time less than the preset time period.

10. A control device comprising:
an input unit including a first button and a second button;
a transceiver; and
at least one processor configured to:
receive a first user command by the first button included in the control device,
control the transceiver to transmit a first control command for entering a setting mode to at least one of a plurality of external devices based on the received first user command,
receive a second user command by the second button included in the control device while the setting mode of the at least one external device is maintained,
control the transceiver to transmit a second control command for registering a setting state of the at least one external device at a time point when the second control command is received at the at least one external device, to the at least one external device based on the received second user command,
receive a third user command by a third button included in the control device,
control the transceiver to transmit a third control command for changing a current setting state of the at least one external device to the registered setting state, to the at least one external device based on the received third user command,
obtain order information based on the registered setting states of at least two external devices, and
control the transceiver to transmit sequentially the third control command to the at least two external devices based on the order information.

11. The control device of claim 10, wherein the at least one processor is further configured to:
in response to a setting mode entrance command for registering a setting state being input using a button or a remote controller of the at least one external device through the input device, transmit a setting start signal for allowing the at least one external device to enter a setting mode for registering the setting state, and
in response to the second control command being input through the input device after a setting state of the at least one external device is changed while the setting mode is maintained, register a finally changed setting state of the at least device as the setting state of the at least one external device.

12. The control device of claim 10,
wherein the at least one processor is further configured to,
in response to the second control command being input through the input device, control the transceiver to transmit a setting end signal to the at least one external device, and wherein the setting end signal is a signal for storing a setting state at a time point when the at least one external device receives the setting end signal.

13. The control device of claim 10, wherein the at least one processor is further configured to:
    in response to a setting mode entrance command for registering a setting state being input through the input device, transmit a setting start signal for allowing the at least one external device to enter a setting mode for registering the setting state,
    in response to a setting state additional command while the setting mode is maintained, register a first setting state of the at least one external device as a first setting state, and
    in response to the setting state additional command being re-input through the input device after a setting state of the at least one external device is changed to a second setting state from the first setting state, register the second setting state of the at least one external device as a second setting state.

14. The control device of claim 13, wherein the at least one processor is further configured to:
    in response to an execution command being input through the input, transmit a control command for changing a setting state of the at least one external device to the registered first setting state, and
    in response to the execution command being re-input through the input device, transmit a control command for changing a setting state of the at least one external device to the registered second setting state.

15. The control device of claim 10, wherein the at least one processor is further configured to:
    register a setting state changing order of the at least one external device together, and
    control the transceiver to sequentially transmit the third control command to the at least one external device based on the registered setting state changing order.

16. The control device of claim 10, further comprising:
    a storage,
    wherein the at least one processor is further configured to:
        in response to the second control command being input through the input device, control the transceiver to transmit a setting end signal and a setting state request signal to the at least one external device, and
        in response to a device identifier (ID) and setting state information being received from the at least one external device in response to the setting end signal, match and store the device ID, the received setting state information, and a control code for changing a setting state.

17. The control device of claim 10, further comprising:
    a display,
    wherein the at least one processor is further configured to:
        in response to an operation of generating a widget icon being input, control the transceiver to transmit a setting start signal for allowing the at least one external device to enter a setting mode, to the at least one external device,
        control the display to display a user interface (UI) including a guidance message and a second control command input button,
        in response to the second control command being input through the second control command input button included in the UI after a setting state of the at least one external device is changed, control the transceiver to transmit a setting end signal to the at least one external device and control the display to display the generated widget icon,
        in response to the widget icon being selected, control the display to display the generated widget icon, and
        in response to the widget icon being selected, control the transceiver to transmit the third control command to the at least one external device.

18. The control device of claim 10,
    wherein the second control command is transmitted in response to the second button being pushed for a preset time period or more, and
    wherein an execution command is transmitted when the second button is pushed for a period time less than the preset time period.

19. An integrated control system comprising:
    a control device configured to:
        receive a first user command by the first button included in the control device,
        transmit a first control command for entering a setting mode to at least one of a plurality of external devices based on the received first user command,
        receive a second user command by the second button included in the control device while the setting mode of the at least one external device is maintained,
        transmit a second control command for registering a setting state of the at least one external device at a time point when the second control command is received at the at least one external device, to the at least one external device based on the received second user command,
        receive a third user command by a third button included in the control device,
        transmit a third control command for changing a current setting state of the at least one external device to the registered setting state, to the at least one external device based on the received third user command,
        obtain order information based on the registered setting states of at least two external devices, and
        transmit sequentially the third control command to the at least two external devices based on the order information; and
    the at least one external device being configured to:
        based on receiving the first control command, entering a setting mode,
        based on receiving the second control command, register a setting state at a time point when the second control command is received, and
        based on receiving the second control command, change a current setting state to the registered setting state.

* * * * *